United States Patent Office  3,459,766
Patented Aug. 5, 1969

3,459,766
2,2,5,5-TETRAKIS(POLYFLUOROMETHYL)IMIDAZOLIDINES AND THEIR PREPARATION
William J. Middleton, Wilmington, Del., assignor to E. I. du Pont de Nemours and Company, Wilmington, Del., a corporation of Delaware
No Drawing. Continuation-in-part of application Ser. No. 439,476, Mar. 12, 1965, which is a continuation-in-part of application Ser. No. 461,151, June 3, 1965. This application Feb. 9, 1966, Ser. No. 521,317
Int. Cl. C07d *49/36;* A61k *25/00*
U.S. Cl. 260—309.6                                  16 Claims

ABSTRACT OF THE DISCLOSURE

Described and claimed are the 4-imino-2,2,5,5-tetrakis(polyhalomethyl)imidazolidines and/or their isomers or tautomers, the 4-amino-2,2,5,5-tetrakis(polyhalomethyl)-3-imidazolines, e.g., 4-[1-amino-2,2,2-trifluoro-1-(trifluoromethyl)ethylamino] - 2,2,5,5 - tetrakis(trifluoromethyl)-3-imidazoline, selected derivatives, and their preparation from alkali metal cyanides and polyhaloalkylidenimines, e.g., hexafluoroisopropylidenimine. All the claimed compounds are useful for plasticizing polymers and some are muscle relaxants.

RELATED APPLICATIONS

This application is a continuation-in-part of my copending application Ser. No. 461,151, filed June 3, 1965, now abandoned, itself a continuation-in-part of application Ser. No. 439,476, filed Mar. 12, 1965, and now abandoned.

FIELD OF THE INVENTION

This invention relates to, and has as its principal objects provision of, novel nitrogen heterocyclic compounds, many of which have valuable biological activity, and the preparation of the same.

DETAILS OF THE INVENTION

The novel compounds of this invention are the 4-imino-2,2,5,5-tetrakis(polyhalomethyl)imidazolidines, their isomeric or tautomeric forms, the 4-amino-2,2,5,5-tetrakis(polyhalomethyl)-3-imidazolines, and selected N-hydrocarbyl and N-acyl derivatives of the same. Formulas for these compounds can be written as:

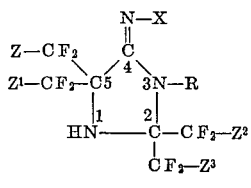

I.  Imidazoline Form

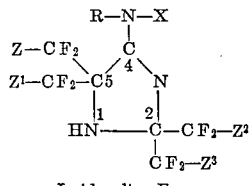

II. Imidazoline Form wherein:
(1) R may be hydrogen, hydrocarbyl, or hydrocarbyl substituted with up to 6 halogens (fluorine, chlorine, bromine) and/or another group selected from the group consisting of —OH, —NH$_2$, —COOH, —COOM (M being an alkali metal or an equivalent of an alkaline earth metal) or hydrocarbyloxy, hydrocarbylthio, hydrocarbylamino, or hydrocarbyloxycarbonyl radicals, which radicals may contain O or N in the hydrocarbon chain and/or be substituted by —OH, —NH$_2$, —COOH, —COOM or halogen ( M and halogen being as defined above);
(2) X may be any of the radicals defined for R or

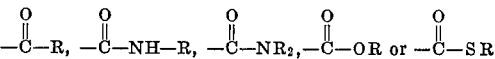

(R being as defined above); and
(3) Z, $Z^1$, $Z^2$ and $Z^3$ may be hydrogen, fluorine or chlorine and either the same or different;
(4) With the proviso that R and X together contain no more than 30 carbons.

The term "hydrocarbyl" used herein means the radical of a hydrocarbon, and it includes alkyl, alkenyl, alkynyl, cycloalkyl, cycloalkenyl, aryl, alkaryl and arakyl radicals.

Compounds of the above structure in which R is H and X and Z are as previously defined are tautomers, and exist in tautomeric equilibrium, especially in solution, as shown by the following formulas:

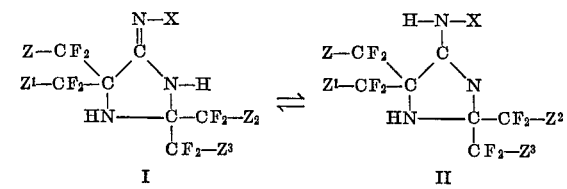

I                                II

As would be expected from this tautomeric equilibrium involving a mobile proton, these compounds have marked acidic properties. For example, this hydrogen will exchange rapidly with deuterium when D$_2$O is added to an acetone solution of the compound, as evidenced by the disappearance of the NH absorption band in the nuclear magnetic resonance spectrum.

In the special case of 4-imino-2,2,5,5-tetrakis-(trifluoromethyl)imidazolidine, in which both R and X are H, and all Z's are F, these two hydrogens exchange with each other so rapidly that only a single absorption band is observed at 25° C. from these protons in the n.m.r. spectrum; and they both exchange rapidly with D$_2$O.

Since compounds of types I and II in which R is H exhibit acidic properties, they can form salts with bases. The salts from the two tautomers are identical, for their anions can be represented by the following resonance forms corresponding to the tautomeric forms of Types I and II.

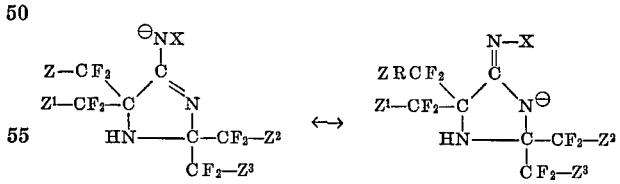

For example, 4-imino-2,2,5,5-tetrakis(trifluoromethyl)-imidazolidine is a weak acid. It can be titrated with a strong base, such as tetramethylammonium hydroxide, in a nonaqueous solvent such as pyridine, to give a sharp end-point. The salt formed in this titration can be represented by the resonance structures:

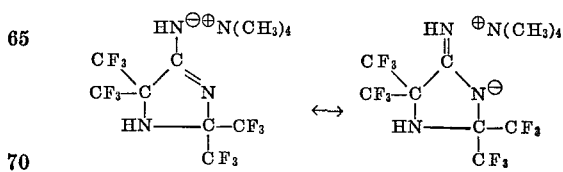

4-acetylimino-2,2,5,5 - tetrakis(trifluoromethyl)imidazolidine (R=H, X=CH$_3$CO—, and all Z's=F) is a stronger acid. It can be titrated in water with sodium hydroxide to give a salt that can be represented by the resonance structures:

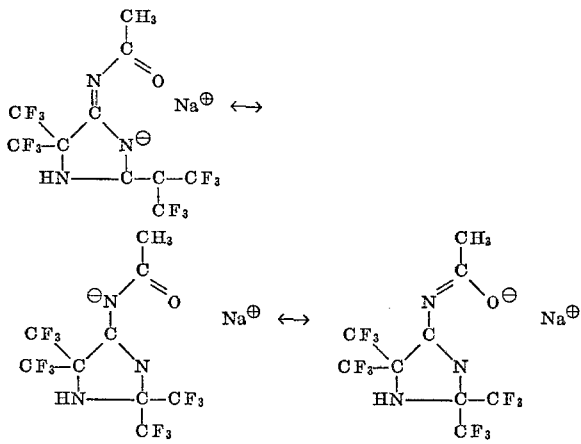

Compounds of the above general formula in which neither R nor X is H exist as isomeric structures similar to types I and II above. Either one or both types of these compounds can be prepared in a single reaction by causing a tautomeric mixture, in which R is H or R and X both are H, to react with an alkylating or acylating reagent. For example, a dimethyl derivative corresponding to type I (R and X=CH₃) and a dimethyl derivative corresponding to type II (R=X=CH₃ and all Z's=F) can be prepared in a single reaction by treating 4-imino-2,2,5,5 - tetrakis(trifluoromethyl)imidazolidine with dimethyl sulfate.

Solid complexes may be formed from the compounds of this invention with solid or liquid complexing agents. Difunctional complexing agents such as diethyl oxalate, dimethyl malonate, diacetyl and benzil have been found most effective, but simpler compounds such as diethyl carbonate also form weak complexes. These complexes are usually isolated in a 1 to 1 molar ratio of compound to complexing agent, even if a molar excess of one of the materials is present. For example, a 1 to 1 complex, dec. 82–85° C., is formed if 4-imino-2,2,5,5-tetrakis(trifluoromethyl)imidazolidine is recrystallized from an ether-pentane solution containing an excess of diethyl oxalate. The stability of a complex depends on the specfiic compound and complexing agent involved. Frequently the complexes tend to decompose or dissociate when heated or put into solution. The above mentioned thermal instability is usually evidenced by a wide melting range. Usually these complexes may be considered as single mixtures or solvates of the compound with complexing agent, and they are usually effective in the same applications as the parent compound.

Compounds of this invention in which R or X contain an amino moiety will form salts with acids such as hydrogen chloride, acetic acid, and the like, and with alkyl halides such as methyl iodide. Such salts are usually more water-soluble than the compounds from which they are derived but have the same general utilities. For the pharmacological purposes of the invention (see below), it will be understood that the acids or bases used to form salts are to be pharmacologically acceptable.

Many of the compounds of this invention are biologically active and cause striking pharmacological effects thereapeutically useful in the treatment of neurological and psychiatric disorders. Thus, they exert depressant effects upon the central nervous system, decreasing skeletal muscle tone, a desirable property for treatment of hypertonic or hyperkinetic motor disorders. This property is also useful in causing relaxation in general anesthesia. Compounds active as central nervous system depressants include all of those of Formulas I and II except those in which Z is chlorine, either or both of R and X are hydro-carbyl substituted with hydrocarbyloxycarbonyl, hydrocarbylthio, —COOH or —COOM, and/or X is

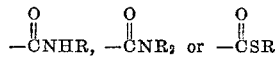

Preferred central nervous system depressants include those compounds in the above-defined active group in which any alkyl substituent contains 1–4 carbon atoms; any aryl, aralkyl or alkaryl substituent contains 6–8 carbon atoms; and any hydrocarbyloxycarbonyl substituent contains 1–13 carbon atoms.

The tautomeric compounds of this invention in which both R and X are H, e.g.,

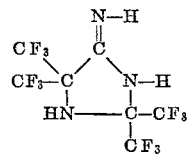

and

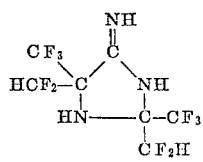

(tautomerism or isomerism being disregarded), can be prepared by reacting the respective appropriate polyhaloalkylidenimines with an alkali metal cyanide and heating the reaction mixture. The two compounds just depicted are themselves preferred phamacological agents of the invention, and all of this type (R=X=H) can serve as precursors for other of the compounds through chemical procedures hereinafter described.

The synthesis discussed generally above can be regarded more specifically as a two-step process including (1) a reaction between a polyhaloalkylidenimine and an alkali metal cyanide, e.g., sodium or potassium cyanide, to form a polyhalomethylethylamino-substituted intermediate followed by (2) heating of the intermediate to eliminate the polyhalomethylethylamino substituent, preferably in an acid such as a mineral acid and most preferably, as illustrated hereinafter, in concentrated sulfuric acid. An equation for this process, in which the Z's are as defined above, can be written (again disregarding isomerism) as:

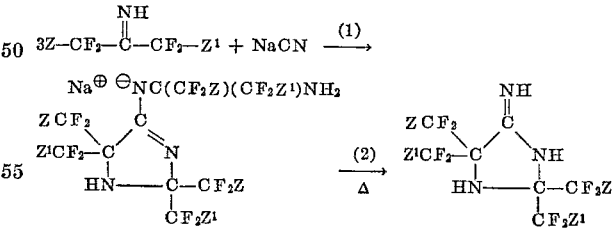

The polyhalomethylethylamino-substituted intermediate can be isolated and is itself one of the compounds of the invention.

It will be understood that, if it is desired that more than two Z's be different in the reaction above, more than one imine must be employed in the reaction mixture with more than one resultant product. It will also be understood that, while the stoichiometry of the intermediate requires that three moles of the imine react with one of the inorganic cyanide, the proportions of the reactants in the reaction mixture are relatively unimportant other than to conserve materials. The order of mixing the reactants is not critical.

The above process is preferably carried out in an inert reaction medium such as dimethylformamide; dimethyl sulfoxide; liquid nitriles, e.g., acetonitrile and benzonitrile; glycol ethers, e.g., dimethyl ethers of ethylene diethylene glycols; etc.

The reaction is exothermic and the rate of addition of the imine to the alkali metal cyanide, or the cyanide to the imine, is adjusted so that the reaction temperature is maintained in the range of about $-40°$ C. to about $100°$ C. Preferably the temperature is held in the lower portion of this operable range in order to minimize formation of by-products. The reaction mixture that is obtained at the completion of the addition of reactants is acidified wih a dilute aqueous solution of a mineral acid, e.g., 10% hydrochloric acid, to form, in the case where hexafluoroisopropylidinimine is used as the imine reactant, 4-[1 - amino-2,2,2-trifluoro-1-(trifluoromethyl)ethylamino]-2,2,5,5-tetrakis(trifluoromethyl) - 3 - imidazoline. This intermediate is dissolved in concentrated sulfuric acid and heated for a few minutes, e.g., 10 minutes, at a temperature of about 100–150° C. After cooling to 20° C., the solution is poured onto crushed ice whereupon solid 4-imino-2,2,5,5-tetrakis(trifluoromethyl)-imidazolidine is precipitated. This product is isolated and purified by conventional means.

The imines of the formula

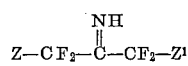

used as starting materials in the above-described process can be prepared in various ways. Those in which Z and $Z^1$ in the formula are fluorine or chlorine can be prepared as shown in my U.S. Patent No. 3,226,439, and in J. Org. Chem. 30, 1398 (1965). Those in which Z or $Z^1$, or obth, are hydrogen, can be prepared by a modification of the method of Zeifman et al., Akad. nauk S.S.S.R. Doklady, 153, 1334 (1963), for preparing hexafluoroiseopropylidenimine. The process for preparing pentafluoroisopropylidenimine involves first reacting pentafluoroacetone with phenyl isocyanate at about 200° C. in the presence of a catalytic amount of a triarylphosphine oxide to form N-phenylpentafluoroisopropylidenimine, involves first reacting pentafluoroacetone with phenyl isocyanate at about 200° C. in the presence of a catalytic amount of a triarylphosphine oxide to form N-phenylpentafluoroisopropylidenimine, which is then treated with ammonia to give N-phenyl-2,2-diaminopentafluoropropane. This product, which need not be isolated or purified prior to the next and last step, is then reacted with phosphorus pentoxide, whereby it splits off aniline with formation of pentafluoroisopropylidenimine.

The compounds of the invention in which R and/or X is other than hydrogen can be prepared from those in which both R and X are hydrogen, or the alkali metal salts of these latter compounds, by treatment with conventional alkylating or acylating agents. The resulting derivatives are also novel compounds which are useful for various purposes. The reaction can be carried out by contacting the imidazolidine (R=X=H), or the alkali metal salts of the imidazolidines, with the alkylating or acylating reagents, without solvent or in the presence of an inert solvent, at a temperature from 0° to 200° C., and isolation of the product by conventional means, such as distillation, recrystallization, or sublimation.

The alkylated derivatives are the compounds of this invention in which either R or R and X are hydrocarbyl groups or substituted hydrocarbyl groups. Suitable alkylating reagents include hydrocarbyl or substituted hydrocarbyl sulfates, p-toluenesulfonates, and halides. Other special alkylating reagents, such as formaldehyde or formaldehyde in combination with ammonia or amines (Mannich aminomethylating reagents), can be used to produce compounds in which R is hydroxymethyl, hydroxymethoxymethyl, or aminomethyl.

The acylated derivatives are the compounds of this invention in which X is acyl or substituted acyl. Suitable acylating reagents are acyl (or substituted acyl) halides and anhydrides, ketenes, and isocyanates. In the special case in which the acylating reagent is oxalyl chloride, 4 - iseocyanato - 2,2,5,5 - tetrakis(polyfluoromethyl)-3-imidazolines are formed, and these isocyanates can be further reacted with alcohols, thiols, ammonia, and amines to give carbamates, thiocarbamates, and ureas.

SPECIFIC EMBODIMENTS OF THE INVENTION

This invention is illustrated in further detail by the following examples:

EXAMPLE 1

A. Preparation of 4-[1-amino-2,2,2-trifluoro-1-(trifluoromethyl)ethylamino] - 2,2,5,5 - tetrakis(trifluoromethyl)-3-imidazoline R=H; X=—C(CF$_3$)$_2$NH$_2$; all Z's=F)

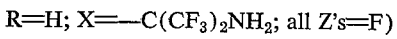

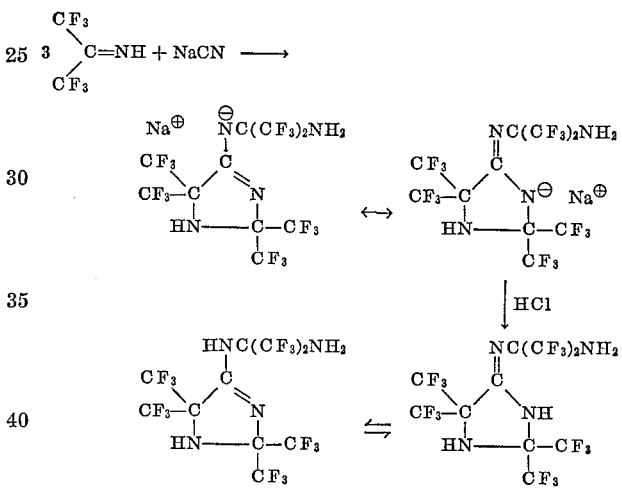

Hexafluoroisopropylidenimine, 20 ml. at $-10°$ C. (ca. 30.8 g., 0.187 mole), was slowly distilled into a stirred suspension of 3.06 g. (0.0625 mole) of powdered sodium cyanide in 50 ml. of dimethyl sulfoxide. An exothermic reaction ensued. The rate of addition of the imine was adjusted so that the temperature of the reaction mixture did not rise above 65° C. At the end of the addition, about 20 minutes being required, the reaction mixture became homogeneous. The mixture was cooled to 20° C. and then poured into 500 ml. of water containing 100 ml. of 10% hydrochloric acid. The oil that formed was separated by decanting the aqueous phase. Fresh water (500 ml.) was added, and the oil and water were shaken vigorously together. The oil solidified. This solid was collected on a filter and pressed dry, and then dried in a vacuum desiccator over phosphorus pentoxide. There was obtained 24.1 g. (74% of theory) of 4-[1-amino-2,2,2-trifluoro-1-(trifluoromethyl) - ethylamino] - 2,2,5,5 - tetrakis(trifluoromethyl)-3-imidazoline as a hydrophobic white solid, M.P. 45–46° C. A sample was recrystallized from pentane for analysis. The $F^{19}$ N.M.R. spectrum in CDCl$_3$ showed two septets (J=5.0 c.p.s.) centered at 72.8 and 77.9 p.p.m. from trichlorofluoromethane used as an internal standard, and a singlet at 79.8 p.p.m., all of equal area. The proton N.M.R. spectrum in CDCl$_3$ showed two very broad singlets at 5.55 and 3.57 p.p.m. (each, area 1) and a broad singlet at 3.08 p.p.m. (area 2) from tetramethylsilane used as an internal standard. The infrared spectrum showed a band at 5.97$\mu$.

*Analysis.*—Calcd. for $C_{10}H_4F_{18}N_4$: C, 23.00; H, 0.77; F, 65.49. Found: C, 23.21; H, 0.91; F, 65.23.

B. Preparation of 4-imino-2,2,5,5-tetrakis-(trifluoromethyl)imidazolidine

R=X=H; all Z's=F

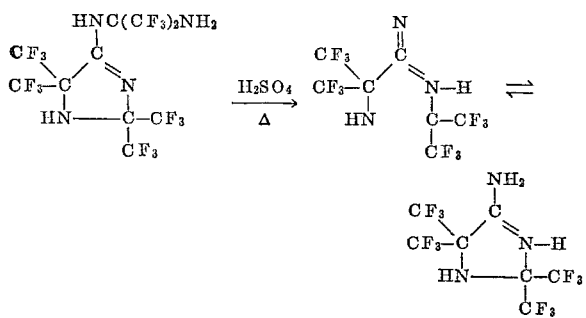

4-[1-amino - 2,2,2 - trifluoro-1-(trifluoromethyl)-ethylamino]-2,2,5,5-tetrakis(trifluoromethyl) - 3 - imidazoline, 47.1 g., prepared as described in Part A above, was dissolved in 100 ml. of concentrated sulfuric acid, and the stirred solution was heated slowly to 150° C. and held at that temperature for 10 minutes. Frothing occurred during the heating period. The solution was then cooled to 20° C. and poured over 1 liter of crushed ice. The white solid that formed was collected on a filter after the ice had melted, and was washed with water. Recrystallization from alcohol-water (1:2) gave 31.5 g. (98% yield) of 4-imino-2,2,5,5-tetrakis(trifluoromethyl)imidazolidine as long, colorless needles, M.P. 158–159° C.

EXAMPLE 2

Preparation of 4-imino-2,2,5,5-tetrakis-(trifluoromethyl)imidazolidine

R=X=H; all Z's=F

This example illustrates the removal of the polyfluoromethylethylamino substituent from the intermediate, i.e., step 2 of the process, by heating the reaction mixture of the first step during distillation at atmospheric pressure to eliminate solvent.

Hexafluoroisopropylidenimine (25 g., 0.15 mole) was slowly distilled into a stirred suspension of 10 g. (0.2 mole) of sodium cyanide in 50 ml. of acetonitrile. An exothermic reaction ensued. The mixture was cooled to keep the temperature below 35° C. After the addition, the reaction mixture was stirred for 30 minutes at room temperature, and then 50 ml. of water was added. The pH of the solution was adjusted to 7 by the addition of a small quantity of hydrochloric acid. The organic layer was separated, washed twice with water and dried with anhydrous magnesium sulfate. The liquid was removed by distillation at atmospheric pressure, and the solid residue was recrystallized twice from benzene using decolorizing charcoal. There was obtained 4.1 g. (15% of theory) of 4 - imino-2,2,5,5-tetrakis(trifluoromethyl)imidazolidine as colorless needles, M.P. 159–160° C. The proton N.M.R. spectrum in dimethyl sulfoxide contained a broad singlet at +7.2 p.p.m. (area 2) and a sharp singlet at +6.06 p.p.m. (area 1). The $F^{19}$ N.M.R. spectrum in acetone contained a pair of septets (J=4.7 c.p.s.) at 71.5 and 76.5 p.p.m. from trichlorofluoromethane used as an internal standard. The infrared spectrum contained bands at 2.85, 2.9, 2.96, 3.04, 3.10, 3.16, 5.9 and 6.2μ. The very strong band at 5.9μ indicates the 4-imino tautomer to be present in major amount.

*Analysis.*—Calcd. for $C_7H_3F_{12}N_3$: C, 23.55; H, 0.85; F, 63.85; N, 11.77. Found: C, 23.77; H, 1.35; F, 64.05; N, 12.05.

The muscle-relaxant activity of this compound, 4-imino-2,2,5,5-tetrakis(trifluoromethyl)imidazolidine, is demonstrated by the production of loss of the righting reflex in mice [Domino, E. F., et al., J. Pharmacol. Exptl. Therap., 105, 486–497 (1952)] and in producing abolition of muscular rigidity in decerebrate cats [Goodman, L., Bull. New England Med. Center 5, 97–100 (1943)]. The compound is 10 to 60 times as active as chlordiazepoxide, a drug widely used in the treatment of disorders of the skeletal muscle system. In addition, it has a therapeutic ratio of 12 in the mouse-relaxant test in comparison with that of chlordiazepoxide which has a therapeutic ratio of 6.5.

A complex of this imidazolidine with diethyl oxalate also shows pronounced central nervous system activity similar to that of the uncomplexed imidazolidine.

EXAMPLE 3

4-imino-2,5-bis(chlorodifluoromethyl)-2,5-bis-(trifluoromethyl)imidazoline

R=X=H; Z=Z³=Cl; Z¹=Z²=F

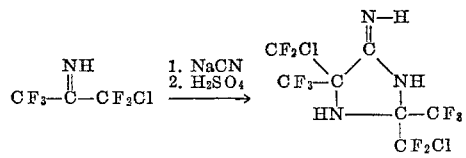

Sodium cyanide, 1.61 g. (0.033 mole), was added portionwise over a period of 60 min. to a stirred solution of 11.73 g. (0.065 mole) of chloropentafluoroisopropylidenimine in 25 ml. of dimethylformamide cooled to −10° C. During the addition, the temperature of the reaction mixture was maintained between −5° and −10° C. by cooling with an ice-methanol bath. The reaction mixture was then stirred for one hour at 25° C. and poured into 100 ml. of 10% hydrochloric acid. The oil that separated i.e., crude 4-[-1-amino-2-chloro-2,2-difluoro-1 - (trifluoromethyl)ethylamino]-2,5-bis(chlorodifluoromethyl) - 2,5-bis(trifluoromethyl)-3-imidazoline, was washed twice with water and then dissolved in 10 ml. of 20% fuming sulfuric acid. The sulfuric acid solution was heated to 135° C. and then cooled and poured over 100 g. of crushed ice. The light-yellow solid that formed was collected on a filter, washed with water, and dried in a vacuum. Sublimation at 130° C. (10 mm.) gave 5.93 g. of 4-imino-2,5-bis(chlorodifluoromethyl) - 2,5 - bis(trifluoromethyl) imidazolidine as a white crystalline powder, M.P. 120–122° C. (sealed cap.). A sample of the imidazolidone was also prepared by adding the imine to a suspension of sodium cyanide in dimethyl sulfoxide. The $F^{19}$ N.M.R. in acetone showed complex multiplets centered at +57.3, +62.1, +69.7 and +73.9 p.p.m. from $CFCl_3$. The $H^1$ N.M.R. in $(CD_3)_2CO$ showed broad absorptions at τ 4.09 (1H) and τ 2.9 (2H). The infrared spectrum showed a band at 5.94μ for C=N.

*Analysis.*—Calcd. for $C_7H_3Cl_2F_{10}N_3$: C, 21.56; H, 0.77; Cl, 18.18; F, 48.72; N, 10.77. Found: C, 21.94; H, 0.98; Cl, 18.03; F, 48.71; N, 10.79.

The chloropentafluoroisopropylidenimine starting material for the above example can be prepared from chloropentafluoroacetone by the procedure described in Example III of U.S. Patent No. 3,226, 439.

EXAMPLE 4

4-imino-2,2,5,5-tetrakis(chlorodifluoromethyl) imidazolidine

R=X=H; all Z's=Cl

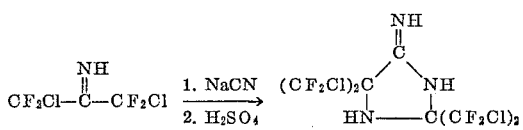

Powdered sodium cyanide, 11.8 g. (0.24 mole), was added portionwise over 15 min. to a stirred solution of 47.5 g. (0.24 mole) of 1,3-dichloro-1,1,3,3-tetrafluoroisopropylidenimine (Example III of U.S. Patent No. 3,226,439) in 80 ml. of dimethylformamide cooled to 0°

C. As the addition proceeded, the reaction mixture warmed slightly, and the rate of addition was adjusted so that the temperature remained below 10° C. After the addition, the reaction mixture was poured into 200 ml. of 10% hydrochloric acid, and the oil that separated, i.e., crude 4-[1-amino-2-chloro - 2,2 - difluoro - 1 - (chlorodifluoromethyl)ethylamino] - 2,2,5,5 - tetrakis(chlorodifluoromethyl - 3-imidazoline, was washed with water and then dissolved in 50 ml. of 20% fuming sulfuric acid. The sulfuric acid solution was heated to 150° C. and then cooled and poured over 200 ml. of crushed ice. The solid that formed was collected on a filter, washed with water, and dried in air. Sublimation at 150° C. (0.5 mm.) gave 26.5 g. of 4-imino - 2,2,5,5 - tetrakis(chlorodifluoromethyl)imidazolidine as a light-yellow crystalline solid, M.P. 126–133° C. The $F^{19}$ N.M.R. in acetone showed 4 complex multiplets centered at about +53.5, +55.1, +58.3 and +58.8 p.p.m. from $CFCl_3$. The infrared spectrum showed a band at $5.93\mu$ for C=N.

*Analysis.*—Calcd. for $C_7H_3Cl_4F_8N_3$: C, 19.87; H, 0.72; Cl, 33.53; F, 35.93; N, 9.84. Found: C, 20.22; H, 0.89; Cl, 33.85; F, 35.91; N, 9.61.

EXAMPLE 5

4-imino-2,5-bis(difluoromethyl)-2,5-bis(trifluoromethyl) imidazolidine $R=X=H$; $Z=Z^2=F$; $Z^1=Z^3=H$

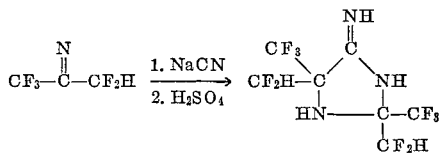

A solution of 24.1 g. (0.163 mole) of pentafluoroisopropylidenimine (prepared as described below) in 50 ml. of dimethylformamide was cooled to 0° C. and 4.9 g. (0.1 mole) of powdered sodium cyanide was added portionwise over a period of 30 min. Cooling was maintained so that the temperature did not rise above 5° C. The reaction mixture was stirred for 2 hours at 25° C. and then poured into 200 ml. of 10% hydrochloric acid. The oil that separated, i.e., crude 4-[1-amino-2,2-difluoro-1-(trifluoromethyl)ethylamino] - 2,5 - bis(difluoromethyl) - 2,5-bis(trifluoromethyl)-3-imidazoline, was washed with 200 ml. of water, and then dissolved in 25 ml. of 20% fuming sulfuric acid. The sulfuric acid solution was heated to 150° C., cooled, and poured over 25 g. of ice. The solid that formed was collected on a filter and washed with water. Sublimation at 100° C. (10 mm.) gave 2.9 g. of a white crystalline powder, M.P. 118–119.5° C. (sealed cap.; Product A).

The filtrate was diluted further with 200 ml. of water and made slightly basic with 50% aqueous potassium hydroxide. The precipitate that formed was collected on a filter, washed with water, dried in air, and sublimed at 100° C. (10 mm.). There was obtained 5.79 g. of 4-imino-2,5-bis(difluoromethyl) - 2,5 - bis(trifluoromethyl) imidazolidine as a white crystalline powder, M.P. 142–144° C. (sealed cap.; Product B). The $F^{19}$ N.M.R. of product B in acetone indicated that it was a mixture of two isomers, with one predominating. The $CF_3$ region showed a complex multiplet at +72.8 p.p.m. (3F) and complex multiplets in about a 1:2 ratio at 77.1 and 77.7 p.p.m. (both together, 3F); the $CF_2H$ region showed two doublets (J=54 c.p.s.) split further into complex multiplets centered at +127.0 and +131.0 p.p.m. The $H^1$ N.M.R. showed two triplets (J=54 c.p.s.) with shoulders centered at τ 3.56 and τ 3.98 (1H each); a broad absorption at τ 5.12 (1H) and a very broad absorption at τ 3.0 (2H). The infrared absorption showed a band at $5.91\mu$ for C=N.

*Analysis.*—Calcd. for $C_7H_5F_{10}N_3$: C, 26.18; H, 1.57; F, 59.17; N, 13.08. Found: C, 26.49; H, 1.45; F, 59.15; N, 12.92.

The pentafluoroisopropylidenimine starting material can be prepared by reacting phenyl isocyanate with pentafluoroacetone in the presence of triphenylphosphine oxide at 200° C. to give N-phenylpentafluoroisopropylidenimine. This product is first reacted with ammonia and then with phosphorus pentoxide to produce the desired pentafluoroisopropylidenimine.

EXAMPLE 6

4-imino-5,5-bis(chlorodifluoromethyl)-2,2 bis-(trifluoromethyl)imidazolidine $R=X=H$; $Z=Z^1=Cl$; $Z^2=Z^3=F$

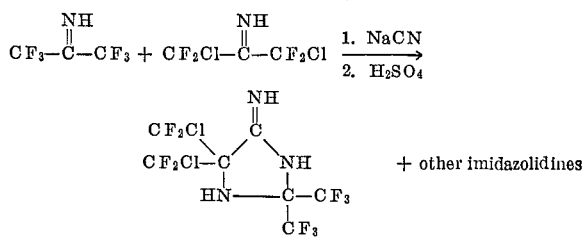

(A) Powdered sodium cyanide, 6.53 g. (0.133 mole), was added portionwise over a period of 30 min. to a stirred solution of 33.0 g. (0.2 mole) of hexafluoroisopropylidenimine and 39.6 g. (0.2 mole) of 1,3-dichlorotetrafluoroisopropylidenimine in 150 ml. of dimethylformamide cooled to −30° C. The reaction mixture was stirred for one hour at −30° C. and then warmed to 25° C. and mixed with 200 ml. of 10% hydrochloric acid. The organic layer was washed twice with water and dissolved in 40 ml. of 20% fuming sulfuric acid. This solution was heated to 150° C., cooled and poured over 100 ml. of crushed ice. The solid that formed was collected on a filter, washed with water, dried and sublimed at 150° C. (10 mm.). There was obtained 33.0 g. of a mixture of imidazolidines as a white crystalline powder, M.P. 118–155° C.

(B) A solution of 30.0 g. of the above-described mixture of imidazolidines in 100 g. of oxalyl chloride was stirred at 25° C. for 3 days and then distilled. There was obtained 9.10 g. of 4-isocyanato-2,2,5,5-tetrakis(trifluoromethyl)-3-imidazoline, B.P. 70.0–70.5° C. (48 mm.), identified by comparison of its infrared spectrum with that of an authentic sample; 9.02 g. of 4-isocyanato-5,5-bis(chlorodifluoromethyl) - 2,2 - bis(trifluoromethyl) - 3-imidazoline as a colorless liquid, B.P. 104–105° C. (48 mm.); and 8.65 g. of 4-isocyanato-2,2,5,5-tetrakis(chlorodifluoromethyl) - 3 - imidazoline, B.P. 142–144° C. (48 mm.), identified by comparison of its infrared spectrum with that of an authentic sample.

The $F^{19}$ N.M.R. spectrum of the sample of 4-isocyanato - 5,5 - bis(chlorodifluoromethyl) - 2,2 - bis(trifluoromethyl)-3-imidazoline indicated that this sample also contained a minor amount (8–9%) of the isomeric 4-isocyanato - 2,2 - bis(chlorodifluoromethyl) - 5,5 - bis(trifluoromethyl)-3-imidazoline, for the sample had two absorption in the $CF_3$ region: one multiplet at +76.0 p.p.m. (relative area 91–92%) and one multiplet at +71.2 p.p.m. (relative area 8–9%) from $CFCl_3$. The infrared spectrum showed a strong band at $4.40\mu$ for NCO.

*Analysis.*—Calcd. for $C_8HCl_2F_{10}N_3O$: C, 23.10; H, 0.24; Cl, 17.05; F, 45.67. Found: C, 23.23; H, 0.57; Cl, 17.07; F, 45.37.

(C) Six grams of 4-isocyanato-5,5-bis(chlorodifluoromethyl) - 2,2 - bis(trifluoromethyl) - 3 - imidazoline containing 8–9% of the isomeric 4-isocyanato-2,2-bis(chlorodifluoromethyl) - 5,5 - bis(trifluoromethyl)-3-imidazoline, was mixed with 25 ml. of concentrated sulfuric acid. An evolution of gas occurred. Water, 2 ml., was added, and the solution was heated to 150° C., then cooled and poured over 25 ml. of crushed ice. The solid that formed was collected on a filter, washed with water, dried, and sublimed at 110° C. (10 mm.) to give 5.25 g. of 4-imino- 5,5-bis(chlorodifluoromethyl) - 2,2 - bis(trifluoromethyl)-imidazolidine as a white crystalline powder, M.P. 129–132° C. (sealed cap.). The F¹⁹ N.M.R. spectrum in acetone indicated that the sample contained 8–9% of the isomeric 4 - imino-2,2-bis(chlorodifluoromethyl)-5,5-bis-(trifluoromethyl)imidazolidine, for the sample had two absorptions in the CF$_3$ region: one multiplet at +76.2 p.p.m (relative area 91–92%) and one multiplet at +71.1 p.p.m. (relative area 8–9%). The infrared spectrum had a band at 5.90μ for C=N.

*Analysis.*—Calcd. for $C_7H_3Cl_2F_{10}N_3$: C, 21.56; H, 0.77; Cl, 18.18; F, 48.72; N, 10.77. Found: C, 20.98; H, 0.64; Cl, 18.01; F, 48.64; N, 10.67.

EXAMPLE 7

3-methyl- and 3-methyl-4-methylimino derivatives of 4-imino-2,2,5,5-tetrakis(trifluoromethyl)imidazolidine R=—CH$_3$; X=H and —CH$_3$; all Z's=F

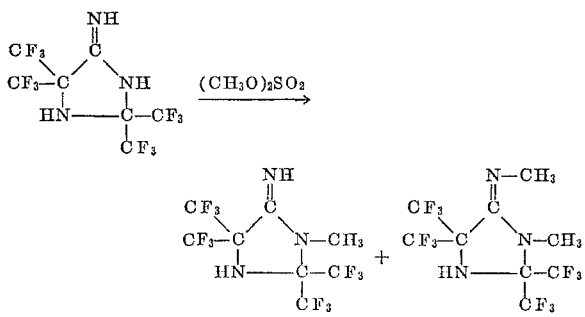

A solution of 10.0 g. of 4-imino-2,2,5,5-tetrakis(trifluoromethyl)imidazolidine in 20 ml. of dimethyl sulfate was heated quickly to boiling (ca. 188° C.). Water, 50 ml., was added dropwise to the hot reaction mixture to decomposed the excess dimethyl sulfate. The resulting solution was then cooled and neutralized with about 135 ml. of 10% aqueous sodium hydroxide, and the white solid that separated was collected on a filter, washed thoroughly with water, and dried in air. There was obtained 9.42 g. of a crude mixture of methylated derivatives. Gas chromatographic analysis in a column packed with firebrick impregnated with the petroleum grease known as "Apiezon" L at 95° C. showed the mixture consisted of 73% of the dimethyl derivative (second eluted component) and 23% of the monomethyl derivative (first eluted component).

The two compounds were separated by fractional recrystallization from pentane. The progress of the recrystallizations was followed by gas chromatography, and each component was recrystallized until it was more than 99% pure.

Pure 4-imino-3-methyl-2,2,5,5-tetrakis(trifluoromethyl)imidazolidine was obtained as the least soluble component (the original 23% component) in the form of colorless needles, M.P. 121–122° C. (sealed cap.). The infrared spectrum showed a band at 5.95μ for C=N. The F¹⁹ N.M.R. in acetone showed a septet (J=4.6 c.p.s.) centered at 73.6 p.p.m and a multiplet at 75.4 p.p.m. from CCl$_3$F used as an internal standard. The H¹ N.M.R. in the $(CD_3)_2CO$ showed a septet ($J_{HF}$=0.85 c.p.s.) at 3.12 p.p.m. (area 3) and two broad absorptions at 8.1 and 5.95 p.p.m. (area, 1 each).

*Analysis.*—Calcd. for $C_8H_5F_{12}N_3$: C, 25.89; H, 1.36; F, 61.43; N, 11.32. Found: C, 25.92; H, 1.54; F, 60.73; N, 11.92.

Pure 3-methyl-4-methylimino-2,2,5,5-tetrakis(trifluoromethyl)imidazolidine was obtained as the most soluble component (the original 73% component) in the form of a white crystalline powder, M.P. 48–49° C. The infrared spectrum showed a badn at 5.92μ for C=N. The F¹⁹ N.M.R. spectrum in acetone showed a pair of septets (J=4.6 c.p.s.) at 73.6 and 75.4 p.p.m. from CCl$_3$F used as an internal reference. The H¹ N.M.R. spectrum in $(CD_3)_2CO$ showed singlets at 3.33 and 3.02 p.p.m. (area 3 each) and a broad absorption at 6.25 p.p.m. (area 1) from $(CH_3)_4Si$ used as an internal reference.

*Analysis.*—Calcd. for $C_9H_7F_{12}N_3$: C, 28.06; H, 1.83; F, 59.20; N, 10.91. Found: C, 28.30; H, 1.89; F, 58.51; N, 10.65.

EXAMPLE 8

3-ethyl-4-imino-2,2,5,5-tetrakis(trifluoromethyl) imidazolidine

R=—C$_2$H$_5$; X=H; All Z's=F

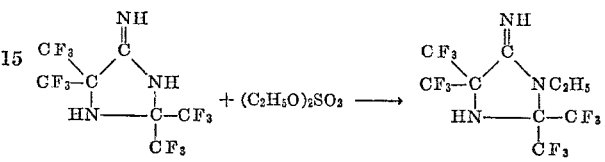

A mixture of 5.0 g. of 4-imino-2,2,5,5-tetrakis(trifluoromethyl)imidazolidine and 10 ml. of diethyl sulfate was heated to boiling (ca. 200° C.) for 5 minutes, and then water was cautiously added to the hot reaction mixture to decompose the excess diethyl sulfate. Activated charcoal, 1.0 g., was added, and the mixture filtered. The filtrate was neutralized with 10% aqueous sodium hydroxide, and the solid that precipitated was collected on a filter and recrystallized from pentane. There was obtained 2.48 g. of 3-ethyl-4-imino-2,2,5,5-tetrakis(trifluoromethyl)imidazolidine as colorless needles, M.P. 113–114° C. (sealed cap.). The infrared spectrum contained a band at 5.96μ. The F¹⁹ N.M.R. spectrum in acetone showed two septets (J=4.6 c.p.s.) centred at 73.7 and 75.4 p.p.m. from CCl$_3$F used as an internal standard. The H¹ N.M.R. showed two broad absorptions at 6.30 and 7.75 p.p.m. (area 1 each), a quartet (J=7 c.p.s.) centered at 3.54 p.p.m. (area 2), and a triplet (J=7 c.p.s.) centered at 1.15 p.p.m. (area 3) from $(CH_4)_4Si$ used as an internal reference.

*Analysis.*—Calcd. for $C_9H_7F_{12}N_3$: C, 28.06; H, 1.83; F, 59.20; N, 10.91. Found: C, 28.40; H, 2.16; F, 58.96; N, 11.16.

EXAMPLE 9

4-dimethylamino-2,2,5,5-tetrakis(trifluoromethyl)-3-imidazoline

R=X=—CH$_3$; All Z's=F

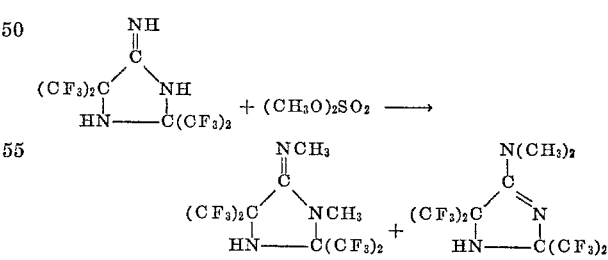

A 10.0 gram sample of 4-imino-2,2,5,5-tetrakis(trifluoromethyl)imidazolidine and 30 ml. of dimethyl sulfate (excess) were heated together for 8 hours at 200° C. in an 80-ml. autoclave lined with the corrosion-resistant alloy known as Hastelloy®. The bomb was cooled to 0° C. and vented. Excess dimethyl sulfate in the recovered dark residue (44 g.) was decomposed at its boiling point by adding 10 ml. of water to it dropwise over 0.5 hour under reflux. The mixture was cooled and neutralized with dilute sodium hydroxide solution. Ether extraction followed by washing (water), drying (magnesium sulfate), and evaporation of the ether extracts led to a white semisolid. The semisolid was dissolved in hot ether-pentane, cooled and filtered. The filtrate was subjected to preparative gas chromatographic analysis, and the two major components excluding solvents were isolated from the effluent gases by trapping with liquid nitrogen. The compound eluted first on a silicone column was 3 - methyl - 4 - methylimino - 2,2,5,5 - tetrakis(trifluoromethyl)imidazolidine (about 1 g. isolated). The compound eluted second (0.8 g. isolated), M.P. 30–33° C., was shown to be 4-dimethylamino-2,2,5,5-tetrakis(trifluoromethyl)-3-imidazoline, on the basis of the following: $H^1$ N.M.R., sharp $(CH_3)_2N$ at 3.19 p.p.m. and NH at 6.05 p.p.m.; $F^{19}$ N.M.R., pair of septets (J=4 c.p.s.) at +69.4 and +7.78 p.p.m. from internal $FCCl_3$ at 56.4 Mc.; IR, in the ring C=N at 6.12$\mu$ and sharp NH at 2.88$\mu$.

*Analysis.*—Calcd. for $C_9H_7N_3F_{12}$ (385.17): C, 28.06; H, 1.83; F, 59.20; N, 10.91. Found: C, 28.51; H, 2.28; F, 59.33; N, 10.85.

EXAMPLE 10

(A) 3 - ethyl - 4 - ethylamino - 2,2,5,5 - tetrakis(trifluoromethyl)imidazolidine and (B) 4-ethylamino-2,2,5,5-tetrakis(trifluoromethyl)-3-imidazoline (A) $R=-C_2H_5$; $X=-C_2H_5$; All Z's=F
(B) $R=H$; $X=-C_2H_5$; All Z's=F A solution of 20.0 g. of 4-imino-2,2,5,5-tetrakis(trifluoromethyl)imidazolidine in 50 ml. of diethyl sulfate was heated at reflux for 75 min., and then water (20 ml.) was cautiously added to the hot reaction mixture to decompose any excess diethyl sulfate. The black reaction mixture was diluted with 300 ml. of water and neutralized with 6 N sodium hydroxide. The organic phase was separated by steam distillation (total volume 100 ml.) followed by ether extraction of the distillate. Concentration gave 23.8 g. of a mixture of solid and oil. The entire sample was retreated with 40 ml. of diethyl sulfate at reflux and isolated as above to give 21.5 g. of an oil. Gas chromatographic analysis showed the oil to consist of 56% of a material with retention time of 10.9 min., 33% of a material with retention time of 12.6 min., 7% of 3-ethyl - 4 - amino - 2,2,5,5 - tetrakis(trifluoromethyl)imidazolidine and 2% of unreacted starting material.

Preparative gas chromatography afforded pure samples of the two major components. The compound (A) eluted first was 3-ethyl-4-ethylimino - 2,2,5,5 - tetrakis(trifluoromethyl)imidazolidine, isolated as an oil, $n_D^{23}$ 1.3624. Distillation through a short path still afforded an analytical sample: $H^1$ N.M.R. 6.7$\tau$—wt. 5, multiplet of roughly two quartets with another overlying peak; and 9.0$\tau$—wt. 6, two overlapping triplets centering at 9.01 (J=7.5 c./s.) and 9.03 (J=6.0 c./s.). In $CDCl_3$, addition of trifluoroacetic acid and deuterium (two phase) changed the 6.7 peak to clean quartet (wt. 4) and 9.0 peak to a triplet (wt. 6). The mass spectrum showed a parent peak at m./e. 413. IR: 3480 (NH) and 1705 cm.$^{-1}$ (C=N).

*Analysis.*—Calcd. for $C_{11}H_{11}F_{12}N_3$: C, 32.0; H, 2.7; F, 55.2; N, 10.2. Found: C, 32.0; H, 2.8; F, 55.7, 55.7; N, 10.3.

The compound eluted second (B) was 4-ethylamino-2,2,5,5 - tetrakis(trifluoromethyl) - 3 - imidazoline isolated as an oil, $n_D^{23}$ 1.3541. An analytical sample was obtained by distillation through a short path still: $H^1$ N.M.R. 5.12$\tau$—wt. 1, broad triplet; 6.6$\tau$—wt. 3, multiplet, appearing to be roughly a quartet split into doublets with an overlapping triplet; and 8.98$\tau$—wt. 3, triplet (J=7.2 c./s.)

In $CDCl_3$, addition of trifluoroacetic acid and deuterium oxide caused the spectrum to simplify to a quartet (wt. 2) at 6.6$\tau$ and a triplet (wt. 3) at 8.9$\tau$ along with a sharp exchange DOH peak. The mass spectrum showed a parent peak at m./e. 385 and the base peak at m./e. 316 (parent —$CF_3^+$).

*Analysis.*—Calcd. for $C_9H_7F_{12}N_3$: C, 28.1; H, 1.8; F, 59.2; N, 10.9. Found: C, 28.0; H, 2.2; F, 58.7, 59.0; N, 11.2.

EXAMPLE 11

3-ethyl-4-methylimino-2,2,5,5-tetrakis(trifluoromethyl) imidazolidine $R=-C_2H_5$; $X=-CH_3$; all Z's=F A solution of 5.0 g. of 3 - ethyl - 4 - imino - 2,2,5,5-tetrakis(trifluoromethyl) imidazolidine in 5 ml. of dimethyl sulfate was heated to reflux for 2 min. and treated with water (1 ml.) while still hot to decompose the excess dimethyl sulfate. An additional 15 ml. of water was added and the mixture neutralized with 6 N sodium hydroxide. The organic phase was separated by ether extraction (3× 10 ml.) and concentration. The resulting yellow oil (5.3 g.) was separated into two major compounds by preparative gas chromatography. The major component (76%) was 3 - ethyl - 4 - methylimino-2,2,5,5 - tetrakis(trifluoromethyl)imidazolidine, isolated as an oil. $H^1$ N.M.R. 6.6–6.9$\tau$—wt. 6, multiplet appearing to consist of a quartet (J=7 c./s.) at 6.68$\tau$ sharp singlet at 6.88$\tau$ and a broad NH centered at 6.62$\tau$; and 9.03$\tau$—wt. 3, triplet (J=7 c./s.). The mass spectrum contained a parent peak at m./e. 399 with a base peak at m./e. 302 (parent —$CF_3$ and $C_2H_4^+$). IR: 3520 (NH) and 1710 cm.$^{-1}$ (C=N)

*Analysis.*—Calcd. for $C_{10}H_9F_{12}N_3$: C, 30.1; H, 2.3; F, 57.1; N, 10.5. Found: C, 30.8, 30.7; H, 2.5, 2.6; F, 57.0, 57.1; N, 10.6, 10.2.

The second major component (15%) was shown to be identical with 4 - dimethylamino - 2,2,5,5 - tetrakis(trifluoromethyl) - 3 - imidazoline.

EXAMPLE 12

4-ethylinimo-3-methyl-2,2,5,5-tetrakis(trifluoromethyl) imidazolidine $R=-CH_3$; $X=-C_2H_5$; all Z's=F A solution of 5.0 g. of 3 - methyl - 4 - imino - 2,2,5,5-tetrakis(trifluoromethyl)imidazolidine in 12.5 ml. of diethyl sulfate was heated to reflux for 15 min. The black mixture was cautiously treated with 5 ml. of water while still hot to decompose the excess diethyl sulfate. An additional 30 ml. of water was added and the mixture neutralized with 6 N sodium hydroxide. A drop of silicone antifoam was added and the mixture distilled until 20 ml. of distillate was collected. The organic phase (4.2 ml.) was extracted into ether (20 ml. and 2× 10 ml). The ether extracts were dried over magnesium sulfate and concentrated to give 5.5 g. of an oil. The crude mixture was subjected to preparative gas chromatography (butanediol succinate at 75° C.) to give an oil which was identical with 4 - ethylimino - 2,2,5,5 - tetrakis(trifluoromethyl) - 3 - imidazoline, and 1.81 g. of an oil which was shown to be 4 - ethylimino - 3 - methyl - 2,2,5,5-tetrakis(trifluoromethyl)imidazolidine, $n_D$ 1.3615. This material had an I.R. absorption spectrum very similar to that of its 3 - ethyl - 4 - methylimino isomer. However, their mass spectra were very different with the 4-ethylimino - 3 - methyl isomer containing the parent peak at m./e. 399 and its base peak at m./e. 384 (parent —$CH_3^+$).

*Analysis.*—Calcd. for $C_{10}H_9F_{12}N_3$: C, 30.1; H, 2.3; F, 57.1; N, 10.5. Found: C, 30.5, 30.8; H, 2.5, 2.6; F, 57.0, 57.0; N, 10.3.

When the procedures of Examples 7–12 are repeated with the dimethyl and diethyl sulfates of those examples replaced by appropriate dialkyl sulfates or alkyl p-toluene-sulfonates in which the alkyl groups have up to 15 carbon atoms, the following alkyl derivatives of 4-imino - 2,2,5,5 - tetrakis(trifluoromethyl)imidazolidines (or their tautomers) can be obtained:

3-butyl-4-imino-2,2,5,5-tetrakis(trifluoromethyl) imidazolidine;
4-dioctylamino-2,2,5,5-tetrakis(trifluoromethyl)-3-imidazoline;

3-decyl-4-decylamino-2,2,5,5-tetrakis(trifluoromethyl)
imidazolidine; and
3-dodecyl-4-imino-2,2,5,5-tetrakis(trifluoromethyl)
imidazolidine.

Likewise, when the procedures of Examples 7–12 are repeated with the particular 4 - imino - 2,2,5,5 - tetrakis-(trifluoromethyl)imidazolidines of those examples replaced by appropriate imidazolidines having difluoromethyl or chlorodifluoromethyl groups in place of the trifluoromethyl group, and similar alkylating agents are used, the following derivatives can be obtained:

4-n-propylamino-2,5-bis(chlorodifluoromethyl)-
2,5-bis(trifluoromethyl)-3-imidazoline;
15 carbon atoms the following alkyl derivatives of 4-imidazolidine; and
4-n-hexyl-2,2,5,5-tetrakis(difluoromethyl)imidazolidine.

The alkylation of the alkali metal salts of 4 - imino-2,2,5,5 - tetrakis(polyfluoroalkyl)imidazolidines with halide alkylating agents is illustrated in Examples 13–17.

EXAMPLE 13

4-benzylamino-2,2,5,5-tetrakis(trifluoromethyl)-3-
imidazoline

R=H; X=—CH$_2$C$_6$H$_5$; all Z's=F

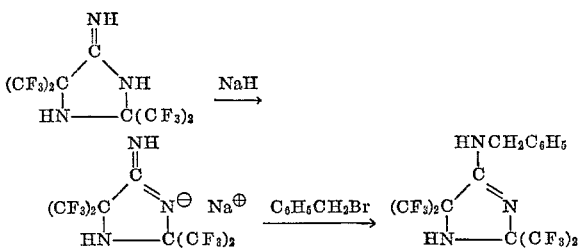

A 7-gram sample (0.02 mole) of 4-imino-2,2,5,5-tetrakis(trifluoromethyl)imidazolidine dissolved in 10 ml. of 1,2-dimethoxyethane was added at <10° C. to 1 g. of 54% sodium hydride-mineral oil (0.02 mole) in 50 ml. of 1,2-dimethoxyethane. The stirred suspension was refluxed for 2 hr., cooled, and 4.0 g. (0.023 mole) of benzyl bromide was added at <10° C. The mixture was heated at reflux for 22 hr. (yellow precipitate), cooled, and filtered to remove the sodium bromide. Distillation of the filtrate through a spinning band column gave 6.3 g. (70%) of 4-benzylamino-2,2,5,5-tetrakis(trifluoromethyl)-3-imidazoline as a colorless liquid, B.P. 120° C. (10 mm.). The H$^1$ N.M.R. showed NH at $\tau$ 2.35 and $\tau$ 3.85, aromatic —H at 2.68 and a doublet (J=6) for a —CH$_2$— split by NH. The F$^{19}$ N.M.R. showed a pair of septets (J=5) at 72.7 and 78.1 p.p.m. from CFCl$_3$. The mass spectrum showed a parent ion at m./e. 447 which was 42% of the base peak at m./e. 91 (CH$_2$C$_8$H$_5$$^+$).

Analysis.—Calcd. for C$_{14}$H$_9$N$_3$F$_{12}$: C, 37.60; H, 2.03; F, 51.10; N, 9.40. Found: C, 37.59; H, 2.13; F, 50.87; N, 9.42.

EXAMPLE 14

4-(carbethoxymethylamino)-2,2,5,5-tetrakis(trifluoromethyl)-3-imidazoline

R=H; X=—CH$_2$COOC$_2$H$_5$; all Z's=F

This compound, M.P. 74–78° C., was prepared by a procedure similar to that of Example 13, except that 4 g. of ethyl bromoacetate was substituted for the benzyl bromide. The H$^1$ N.M.R. spectrum showed a triplet (J=7) at $\tau$ 8.76 for —CH$_3$, a quartet (J=7) a $\tau$ 5.82 for —OCH$_2$, a doublet at $\tau$ 5.81 (J=5.5) for NCH$_2$ and NH absorption at $\tau$ 3.8 and 2.6. The F$^{19}$ N.M.R. spectrum showed a pair of septets at 73.0 and 76.3 p.p.m. from CFCl$_3$. The mass spectrum showed peaks at m./e. 424 (parent —F), 374 (parent —CF$_3$) and 370 (parent —CO$_2$CH$_2$CH$_3$).

Analysis.—Calcd. for C$_{11}$H$_9$N$_3$O$_2$F$_{12}$: C, 29.81; H, 2.05; F, 51.50; N, 9.48. Found: C, 30.40; H, 2.22; F, 50.86; N, 9.58.

EXAMPLE 15

4-(allylamino)-2,2,5,5-tetrakis(trifluoromethyl)-3-
imidazoline

R=H; X=—CH$_2$CH=CH$_2$; all Z's=F

This compound, B.P. 87° C. (25 mm.), was prepared by a procedure similar to that of Example 13, except that 3.0 g. of 3-bromopropene was substituted for the benzyl bromide. The H$^1$ N.M.R. spectrum showed a complex absorption at $\tau$ 3.7–5.1 for —CH=CH$_2$ and one NH, a three-peak absorption at $\tau$ 5.9 for a CH$_2$ group split by NH and —CH= and an NH at $\tau$ 6.4. The F$^{19}$ N.M.R. spectrum showed a pair of septets at 72.8 and 78.0 p.p.m. from CFCl$_3$. The mass spectrum showed a parent ion (43%) at m./e. 397 with the base peak at m./e. 41 (CH$_2$=CHCH$_2$$^+$).

Analysis.—Calcd. for C$_{10}$H$_7$N$_3$F$_{12}$: C, 30.24; H, 1.78; F, 57.40; N, 10.58. Found: C, 30.19; H, 2.16; F, 56.87; N, 10.42.

EXAMPLE 16

4-methylamino-2,2,5,5-tetrakis(trifluoromethyl)-3-
imidazoline

R=H; X=—CH$_3$; all Z's=F

A. This compound, along with other alkylated products, was isolated in 40% yield from a reaction conducted according to the procedure described for Example 13, except that 3.5 g. of methyl iodide was substituted for the benzyl bromide.

B. This material was also prepared by reduction of 4 - isocyanato - 2,2,5,5 - tetrakis(trifluoromethyl) - 3-imidazoline. To 0.70 g. (0.0184 mole) of lithium aluminum hydride in 100 ml. of ether was added 6.15 g. (0.0159 mole) of the isocyanate in 20 ml. of ether dropwise at <10° C. After stirring at 25° C. for 24 hrs., the mixture was decomposed with 200 ml. of 5% hydrochloric acid at <10° C. The layers were separated and the aqueous layer was extracted with ether. The combined ether layers were washed with water and dried over magnesium sulfate. The ether was removed by distillation and the residue was distilled at reduced pressure to give 2.3 g. (38%) of 4 - methylamino - 2,2,5,5 - tetrakis(trifluoromethyl) - 3-imidazoline as a colorless liquid, B.P. 75° C. (10 mm.). The H$^1$ N.M.R. spectrum showed a doublet (J=5.0) at $\tau$ 6.90 for CH$_3$ split by NH and singlets at $\tau$ 5.05 and 6.50 for NH absorption. The mass spectrum showed its base peak at m./e. 302 (parent —CF$_3$) and was consistent with the structure.

Analysis.—Calcd. for C$_8$H$_5$F$_{12}$N$_3$: C, 25.89; H, 1.36; N, 11.32; F, 61.43. Found: C, 25.88; H, 1.51; N, 11.16; F, 60.89.

EXAMPLE 17

4-dimethylaminoethylamino-2,2,5,5-tetrakis(trifluoromethyl)-3-imidazoline

R=H; X=—CH$_2$CH$_2$N(CH$_3$)$_2$; all Z's=F

The sodium salt of 4-imino-2,2,5,5-tetrakis(trifluoromethyl)-3-imidazoline was prepared as described in Example 13. Another equivalent (1 g.) of 54% sodium hydride-mineral oil and 4.85 g. of β-dimethylaminoethyl bromide hydrobromide were added successively at <10° C. The mixture was refluxed for 24 hours, filtered, and the filtrate was distilled to give 5.0 g. (58%) of 4-dimethylaminoethylamino - 2,2,5,5 - tetrakis(trifluoromethyl) - 3-imidazoline as a colorless liquid, B.P. 80–85° C. (7 mm.), that solidified to a white solid, M.P. 47–53° C. upon standing. A sample purified through the hydrochloride had M.P. 58–61° C. The H$^1$ N.M.R. of the free base showed NH bands at $\tau$ 3.4 and 3.9, triplets at 6.5 (J=6, split further) and at τ 7.46 for the NCH₂CH₂N group and a singlet at τ 7.78 for the N(CH₃)₂ group. The F¹⁹ N.M.R. spectrum showed a pair of septets (J=5) at 75.5 and 78.6 p.p.m. from CFCl₃. The mass spectrum showed a parent peak at m./e. 428 with a base peak at m./e. 58 [(CH₃)₂NCH₂⁺].

*Analysis.*—Calcd. for $C_{11}H_{12}N_4F_{12}$: C, 30.85; H, 2.83; F, 53.24; N, 13.08. Found: C, 30.37; H, 2.63; F, 53.40; N, 13.94.

When the procedures of Examples 13–17 are repeated with the alkylating agents of these examples replaced by appropriate hydrocarbyl or substituted-hydrocarbyl halides, the following derivatives of 4-imino-2,2,5,5-tetrakis-(polyfluoromethyl)imidazolidines (or their tautomers) can be obtained:

4-propargylamino-2,2,5,5-tetrakis(trifluoromethyl)-3-imidazoline;
4-cyclohexylamino-2,2,5,-tetrakis(trifluoromethyl)-3-imidazoline;
4-(2-chloroethylamino)-2,2,5,5-tetrakis(trifluoromethyl)-3-imidazoline;
4-(2-methoxyethylamino)-2,2,5,5-tetrakis(trifluoromethyl)-3-imidazoline; and
4-(2-cyclohexenylamino)-2,2,5,5-tetrakis(trifluoromethyl)-3-imidazoline.

The formation of 4-carboxymethyl derivatives of 4 - amino - 2,2,5,5 - tetrakis(polyfluoromethyl) - 3 - imidazolines and their alkali metal salts is illustrated in Examples 18 and 19.

EXAMPLE 18

4-carboxymethylamino-2,2,5,5-tetrakis(trifluoromethyl)-3-imidazoline

R=H; X=—CH₂COOH; all Z's=F

A 10 - gram sample of 4 - carbethoxymethylamino-2,2,5,5-tetrakis(trifluoromethyl)-3-imidazoline (Example 14) was refluxed with 100 ml. of 10% sodium hydroxide solution until the mixture became homogeneous (ca. 1 hr.). The cooled reaction mixture was mixed with 100 g. of ice and acidified to pH 2 with conc. hydrochloric acid. The solid thus formed was extracted with ether and the ether extracts were washed with water and dried over magnesium sulfate. Evaporation of the ether gave a residue which was purified by mixing with 50 ml. of 5% sodium bicarbonate solution. The basified solution was extracted with ether to remove starting material, then cooled and acidified to pH 2. The purified acid was collected on a filter, sucked dry and washed with pentane. The acid was a white solid, 6.48 g. (69%), pK_a 5.48, M.P. 133–135° C. The H¹ N.M.R. spectrum showed a doublet (J=5) at τ 5.79 for NCH₂CO₂, singlets at τ 3.91 and 2.84 (broad) for NH and CO₂H at τ 1.34. The F¹⁹ N.M.R. showed septets (J=6) at 72.8 and 78.0 p.p.m. from CFCl₃. The mass spectrum showed a peak at m./e. 397 (parent —H₂O) and the expected fragmentation.

*Analysis.*—Calcd. for $C_9H_5N_3O_2F_{12}$: C, 26.04; H, 1.21; F, 54.9; N, 10.13; N.E., 415.1. Found: C, 26.15; H, 1.21; F, 54.91; N, 10.27; N.E., 412.6.

EXAMPLE 19

Sodium salt of 4 - carboxymethylamino - 2,2,5,5 - tetrakis(trifluoromethyl)-3-imidazoline R=H; X=—CH₂COONa; all Z's=F This sodium salt was prepared by dissolving 2.8 g. of the acid described in Example 18 in 5% sodium bicarbonate. The last traces of free acid were removed by filtration, and the filtrate was evaporated to dryness giving 3.2 g. of the sodium salt, M.P. 220–230° C. (dec.).

The alkylation of the parent compounds with formaldehyde to form hydroxymethyl and hydroxymethoxymethyl derivatives is illustrated by Examples 20 and 21.

EXAMPLE 20

4-hydroxymethylamino-2,2,5,5-tetrakis(trifluoromethyl)-3-imidazoline

R=H; X=—CH₂OH; all Z's=F

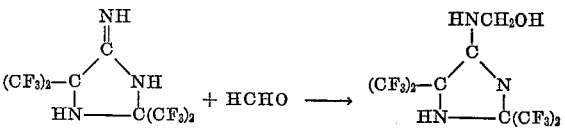

A mixture of 10 g. of 4-imino-2,2,5,5-tetrakis(trifluoromethyl)imidazoline and 50 ml. of 37% aqueous formaldehyde was heated to boiling. The resulting clear solution was cooled to 0° C., diluted with 200 ml. of cold water, and made strongly basic with 100 ml. of 10% sodium hydroxide. The white precipitate that formed was collected on a filter and recrystallized from ether-pentane (10–90%). There was obtained 6.1 g. of 4-hydroxymethylamino-2,2,5,5-tetrakis(trifluoromethyl)-3-imidazoline as a white crystalline powder, M.P. 90–92° C. The infrared spectrum showed a band at 6.00μ for C=N and a strong band at 6.44μ for NH bending. The F¹⁹ N.M.R. spectrum in acetone showed two septets (J=4.8) centered at 72.1 and 77.1 p.p.m. from CFCl₃. The H¹ N.M.R. spectrum in (CD₃)₂CO showed a very broad signal at τ 2.3 (NH), a singlet at τ 3.9 (NH), and a doublet (J=5.4) superimposed on a broader signal (3H) at τ 4.97 for CH₂OH.

*Analysis.*—Calcd. for $C_8H_5F_{12}N_3O$: C, 24.82; H, 1.31; F, 58.89; N, 10.86. Found: C, 25.37; H, 1.47; F, 58.57; N, 11.25.

EXAMPLE 21

4 - (hydroxymethoxymethylamino) - 2,2,5,5 - tetrakis(trifluoromethyl)-3-imidazoline R=H; X=—CH₂OCH₂OH; all Z's=F

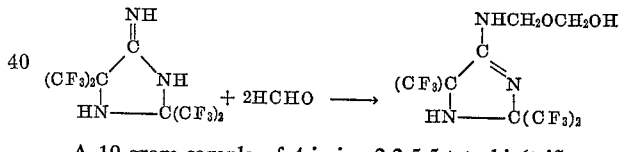

A 10-gram sample of 4-imino-2,2,5,5-tetrakis(trifluoromethyl)imidazolidine was dissolved in 50 ml. of boiling 37% aqueous formaldehyde. The resulting solution was cooled and diluted with 100 ml. of water. The oil that separated was washed with water several times until it solidified. Recrystallization of the solid from ether-pentane gave 8.7 g. of 4-(hydroxymethoxymethylamino)-2,2,5,5-tetrakis(trifluoromethyl)-3-imidazoline as colorless crystals, M.P. 106–109° C. The infrared spectrum showed a band at 6.00μ for C=N and a strong band at 6.44μ for NH bending. The F¹⁹ N.M.R. spectrum in acetone showed two septets (J=4.8) centered at 72.3 and 77.2 p.p.m. from CFCl₃. The H¹ N.M.R. spectrum in (CD₃)₂CO showed a broad signal at τ 2.13 (NH), a singlet at τ 3.72 (NH), a triplet (J=7.5) at τ 4.57 (OH), a doublet (J=6) at τ 4.92 (NCH₂O), and a doublet (J=7.5) at τ 5.15 (OCH₂O).

*Analysis.*—Calcd. for $C_9H_7F_{12}N_3O_2$: C, 25.91; H, 1.69; F, 54.65; N, 10.07. Found: C, 25.88; H, 1.51; F, 54.56; N, 9.89.

When the procedures of Examples 20 and 21 are repeated with 4-imino-2,2,5,5-tetrakis(polyfluoromethyl)-imidazolidines having chlorodifluoromethyl or difluoromethyl groups substituted for the trifluoromethyl groups of the imidazolidines of those examples, the following compounds can be obtained:

4-hydroxymethylamino-2,2,5,5-tetrakis(chlorodifluoromethyl)-3-imidazoline;
4-hydroxymethylamino-2,5-bis(difluoromethyl)-2,5-bis(trifluoromethyl)-3-imidazoline, and
4-(hydroxymethoxymethylamino)-2,2,5,5-tetrakis-(difluoromethyl)-3-imidazoline.

The dialkylaminomethyl derivatives of the parent compounds (i.e., compounds where X and R in the general formula are H) can be prepared by condensing 4-imino-2,2,5,5-tetrakis(polyfluoromethyl)imidazolidines with formaldehyde and ammonia, a primary or a secondary amine, by the well-known Mannich reaction. These reactions can be accomplished by simply warming a mixture containing the 4-iminoimidazolidine, the amine, and formaldehyde (or a formaldehyde precursor such as paraformaldehyde) in water or an alcohol solvent such as ethanol or isoamyl alcohol. This procedure is illustrated in Examples 22, 24, 25, 26, and 29. The preparation of salts of the dialkylamino derivatives with inorganic acids and with alkyl halides is illustrated in Examples 23, 27, and 28.

EXAMPLE 22

4-(n-Pyrrolidylmethylamino)-2,2,5,5-tetrakis(trifluoromethyl)-3-imidazoline

R=H; X=N-pyrrolidylmethyl; all Z's=F

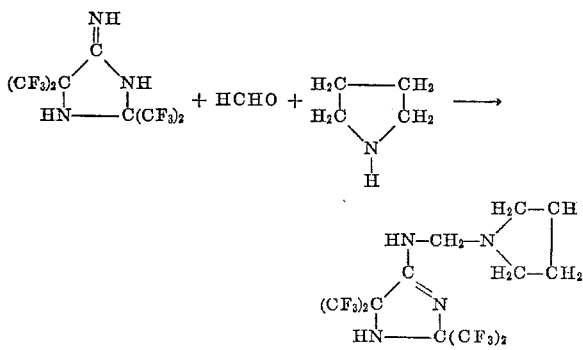

Pyrrolidine, 10 ml., was added to a hot (90° C.) solution of 10 g. of 4-imino-2,2,5,5-tetrakis(trifluoromethylimidazolidine in 50 ml. of 37% formaldehyde (aqueous solution). The resulting reaction mixture was cooled, and the solid that precipitated was collected on a filter, washed with water, and dried. Recrystallization from pentane gave 9.6 g. of 4-(pyrrolidylmethylamino)-2,2,5,5 - tetrakis(trifluoromethyl - 3 - imidazoline as colorless needles, M.P. 127–128° C. The H¹ N.M.R. spectrum in $(CD_3)_2CO$ showed a broad signal at $\tau$ 2.73 (NH), a broad singlet at $\tau$ 3.90 (NH), a singlet at $\tau$ 5.45 (N—CH₂—N) and multiplets at $\tau$ 7.3 (4H) and $\tau$ 8.3 (4H). The $F^{19}$ spectrum showed two septets (J=4.8) centered at 71.0 and 77.2 p.p.m. from $CFCl_3$.

Analysis.—Calcd. for $C_{12}H_{12}F_{12}N_4$: C, 32.74; H, 2.75; F, 51.79; N, 12.73. Found: C, 32.58; H, 3.02; F, 52.30; N, 12.75.

EXAMPLE 23

4-N-pyrrolidylmethylamino)-2,2,5,5-tetrakis(trifluoromethyl)-3-imidazoline hydrochloride

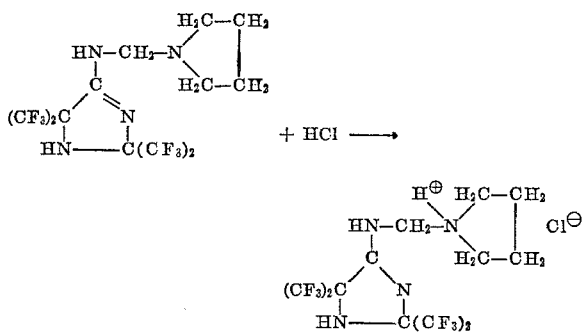

A solution of 3.0 g. of 4-(N-pyrrolidymethylamino)-2,2,5,5 - tetrakis(trifluoromethyl) - 3 - imidazoline in 50 ml. of ether was saturated with dry hydrogen chloride gas. The white precipitate that formed was collected on a filter and washed with ether. There was obtained 3.1 g. of the hydrochloride as a white crystalline powder, M.P. 123–126° C.

Analysis.—Calcd. for $C_{12}H_{13}F_{12}N_4Cl$: Cl, 7.44. Found: Cl, 7.00.

EXAMPLE 24

4-(N-piperidylmethylamino)-2,2,5,5-tetrakis(trifluoromethyl)-3-imidazoline

R=H; X=N-piperidylmethyl; all Z's=F

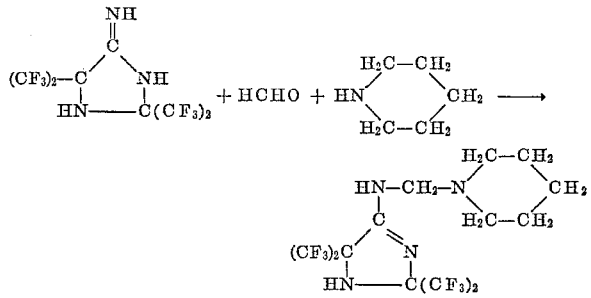

Piperdine, 10 ml., was added to a hot (90° C.) solution of 10 g. of 4-imino-2,2,5,5-tetrakis(trifluoromethyl)-imidazolidine in 50 ml. of 37% formaldehyde (aqueous solution). The reaction mixture was cooled and 100 ml. of water was added. The oil that separated solidified upon standing overnight. The solid was collected on a filter, washed with water, and recrystallized from pentane. There was obtained 8.9 g. of 4-(N-piperidylmethylamino)-2,2,5,5-tetrakis(trifluoromethyl)-3-imidazoline as colorless prisms, M.P. 87–88° C. The H¹ N.M.R. spectrum in $(CD_3)_2CO$ showed a broad signal at $\tau$ 2.83 (NH), a broad singlet at $\tau$ 3.92, a doublet (J=6) at $\tau$ 5.57 (N—CH₂—N), and multiplets at $\tau$ 7.4 (4H) and $\tau$ 8.55 (6H). The $F^{19}$ N.M.R. spectrum showed two septets (J=4.8) centered at 71.8 and 77.1 p.p.m. from $CFCl_3$.

Analysis.—Calcd. for $C_{13}H_{14}F_{12}N_4$: C, 34.37; H, 3.11; F, 50.19; N, 12.33. Found C, 34.00; H, 3.31; F, 50.01; N, 12.34.

EXAMPLE 25

4-(N-morpholinylmethylamino)-2,2,5,5-tetrakis(trifluoromethyl)-3-imidazoline

R=H; X=N-morpholinylmethyl; all Z's=F

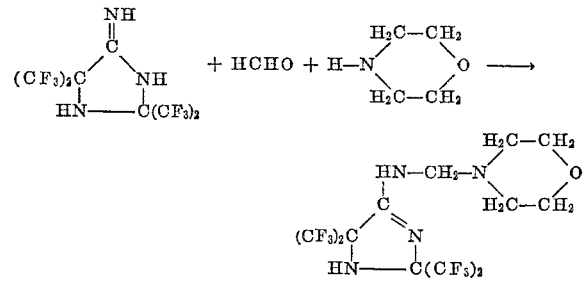

Morpholine, 10 ml., was added to a solution prepared by dissolving 10 g. of 4-imino-2,2,5,5-tetrakis-(trifluoromethyl)imidazolidine in 50 ml. of 37% formaldehyde (aqueous solution). Water, 100 ml., was added and the mixture was cooled. The oil that separated solidified after cooling for 20 hours. The solid was collected on a filter, washed with water, and recrystallized from pentane-ether. There was obtained 3.3 g. of 4-(N-morpholinylmethylamino) - 2,2,5,5 - tetrakis(trifluoromethyl)-3 - imidazoline as colorless crystals, M.P. 139–140° C. The H¹ N.M.R. spectrum in $(CD_3)_2CO$ showed a broad signal at $\tau$ 2.57 (NH), a singlet at $\tau$ 3.80 (NH), a doublet (J=6) at $\tau$ 5.54 (NCH₂N), and multiplets at $\tau$ 6.38 (4H) and $\tau$ 7.38 (4H). The $F_{19}$ N.M.R. spectrum showed two septets (J=4.8) at 71.0 and 77.1 p.p.m. from $CFCl_3$.

Analysis.—Calcd. for $C_{12}H_{12}F_{12}N_4O$: C, 31.59; H, 2.65; F, 49.97; N, 12.28. Found: C, 31.22; H, 2.74; F, 49.89; N, 12.12.

EXAMPLE 26

4-dimethylaminomethylamino-2,2,5,5-tetrakis(trifluoromethyl)-3-imidazoline

R=H; X=dimethylaminomethyl; all Z's=F

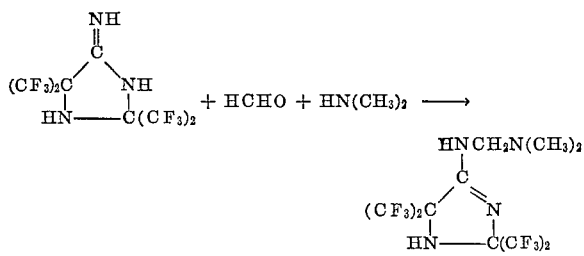

R=H; X=N-pyrrolidylmethyl; all Z's=F

Pyrrolidine, 10 ml., was added to a hot (90° C.) solution of 10 g. of 4-imino-2,2,5,5-tetrakis(trifluoromethyl)-imidazolidine in 50 ml. of 37% formaldehyde (aqueous solution). The resulting reaction mixture was cooled, and the solid that precipitated was collected on a filter, A 10 g. sample of 4-imino-2,2,5,5-tetrakis(trifluoromethyl) imidazolidine was dissolved in 50 ml. of boiling 37% formaldehyde (aqueous solution). The solution was stirred and cooled to 25° C., and 10 ml. of dimethylamine was distilled into the solution over a period of 10 min. The solid that formed was collected on a filter and washed with water. Recrystallization from pentane gave 9.3 g. of 4-dimethylaminomethylamino-2,2,5,5-tetrakis(trifluoromethyl)-3-imidazoline as colorless needles, M.P. 113–114° C. The $H^1$ N.M.R. spectrum in $(CD_3)_2CO$ showed a broad absorption at $\tau$ 2.76 (NH), a singlet at $\tau$ 3.87 (NH), a doublet (J=5) at $\tau$ 5.60 (NCH$_2$N), and a singlet at $\tau$ 7.70 (2CH$_3$). The $F^{19}$ N.M.R. spectrum showed two septets (J=4.8) at 72.2 and 77.2 p.p.m. from CFCl$_3$.

*Analysis.*—Calcd. for $C_{10}H_{10}F_{12}N_4$: C, 29.00; H, 2.44; F, 55.04; N, 13.52. Found: C, 29.04; H, 2.28; F, 54.74; N, 12.94.

EXAMPLE 27

4-dimethylaminomethylamino-2,2,5,5-tetrakis(trifluoromethyl)-3-imidazoline hydrochloride

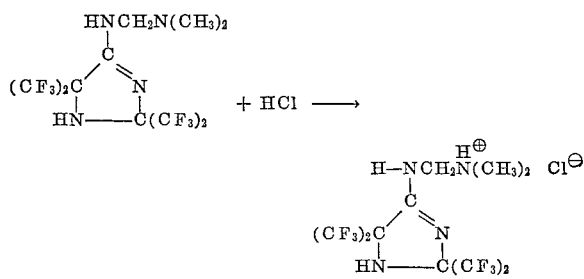

A solution of 2.5 g. of 4-dimethylaminomethylamino-2,2,5,5-tetrakis(trifluoromethyl)-3-imidazoline in 50 ml. of ether was saturated with dry hydrogen chloride gas. The white precipitate that formed was collected on a filter and washed with ether. There was obtained 2.4 g. of the hydrochloride as colorless crystals, M.P. 160–165° C.

*Analysis.*—Calcd. for $C_{10}H_{11}F_{12}N_4Cl$: C, 7.87. Found: Cl, 7.24.

EXAMPLE 28

4-(N-methylpyrrolidiniummethylamino)-2,2,5,5-tetrakis(trifluoromethyl)-3-imidazoline iodide

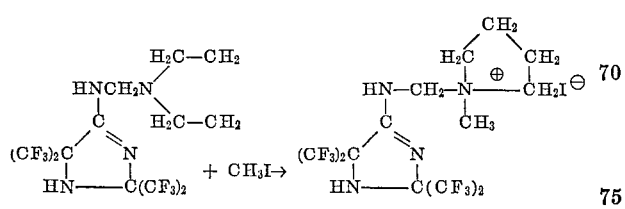

Methyl iodide, 25 ml., was added to a solution of 5.0 g. of 4-(pyrrolidylmethylamino)-2,2,5,5-tetrakis(trifluoromethyl)-3-imidazoline in 25 ml. of ether. The solution was allowed to stand for three hours at 25° C. and the solid that precipitated during this time was collected on a filter and washed with ether. The solid (5.85 g.) was dissolved in acetone and fractionally precipitated by the addition of ether. The first fraction contained no fluorine and was discarded. 4-(N-methylpyrrolidiniummethylamino) - 2,2,5,5 - tetrakis(trifluoromethyl) - imidazoline, 3.0 g., M.P.190–193° C., was obtained as the last fractions. The $H^1$ N.M.R. spectrum in $(CD_3)_2CO$ showed a broad signal at $\tau$ 1.15 (NH), a signlet at $\tau$ 3.34 (NH), a doublet (J=5.5) at $\tau$ 4.60 (NCH$_2$N), a multiplet at $\tau$ 6.0 (4H), a singlet at $\tau$6.61 (CH$_3$), and a multiplet at $\tau$ 7.62 (4H). The $F^{19}$ N.M.R. spectrum showed a pair of septets (J=4.7) at 70.9 and 76.8 p.p.m. from CFCl$_3$.

*Analysis.*—Calcd. for $C_{13}H_{15}F_{12}N_4I$: C, 26.82; H, 2.60; F, 39.16; I, 21.80; N, 9.62. Found: C, 27.01; H, 2.87; F, 38.73; I, 22.13; N, 9.25.

EXAMPLE 29

4-(N-pyrrolidylmethylamino)-2,5-bis(difluoromethyl)-2,5-bis(trifluoromethyl)-3-imidazoline R=H; X=N-pyrrolidylmethyl, Z=Z$^3$=H; Z$^1$=Z$^2$=F

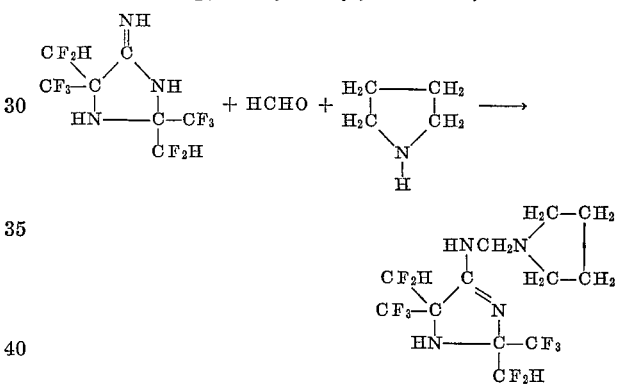

A 2.0 g. sample of 4-imino-2,5-bis(difluoromethyl)-2,5-bis(trifluoromethyl)imidazolidine was dissolved in 5 ml. of hot 37% formaldehyde (aqueous). The solution was cooled and mixed with 2 ml. of pyrrolidine. Water, 100 ml., was added, and the solid that separated was collected on a filter and washed with water. Recrystallization from pentane gave 1.15 g. of 4-(N-pyrrolidylmethylamino)-2,5-bis(difluoromethyl) - 2,5 - bis(trifluoromethyl) - 3-imidazoline as colorless crystals, M.P. 97–99° C. The $H^1$ N.M.R. spectrum in $(CD_3)_2CO$ showed a triplet (J=54) at $\tau$ 3.54 (2H), a broad signal at $\tau$ 3.06 (NH), a singlet at $\tau$ 3.95, a doublet (J=4.5) at $\tau$ 5.54 and multiplets at $\tau$ 7.34 (4H) and $\tau$ 8.31 (4H). The $F^{19}$ N.M.R. spectrum showed multiplets at 73.9 (3F), 77.8 (3F), 126.2 (2F) and 131.6 p.p.m. (2F).

*Analysis.*—Calcd. for $C_{12}H_{14}F_{10}N_4$: C, 35.65; H, 3.49; F. 47.00; N, 13.86. Found: C, 35.76; H, 3.53; F, 46.90; N, 13.53.

EXAMPLE 30

4-acetylimino-2,2,5,5-tetrakis(trifluoromethyl)imidazolidine

R=H; X=—COCH$_3$; All Z's=F

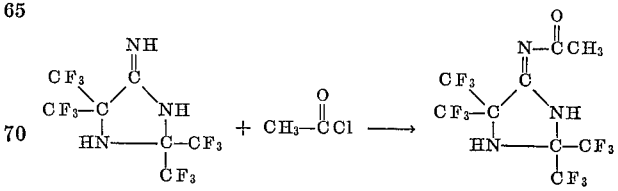

A solution of 5.0 g. (0.014) mole) of 4-imino-2,2,5,5-tetrakis(trifluoromethyl)imidazolidine in 25 ml. of acetyl chloride was heated at reflux for 20 hours. The reaction mixture was then cooled and poured into 300 ml. of cold water to decompose the excess acetyl chloride. The solid that formed was collected on a filter and dried in air. There was obtained 5.32 g. (95% yield) of crude 4-acetylimino - 2,2,5,5 - tetrakis(trifluoromethyl)imidazolidine as a white powder. Recrystallization from alcohol-water gave colorless needles, M.P. 154–155° C. (sealed cap.). The infrared spectrum contained bands at 5.79, 6.00 and 6.61$\mu$. The $F^{19}$ N.M.R. spectrum in acetone showed two septets (J=4.6 c.p.s.) centered at 71.7 and 76.5 p.p.m. from CCl$_3$F used as an internal standard. The $H^1$ N.M.R. spectrum in (CD$_3$)$_2$CO showed a sharp singlet at 2.37 p.p.m. (area 3) and two broad absorptions at 6.54 and 9.20 p.p.m. (area, 1 each) from (CH$_3$)$_4$Si used as an internal reference. The ultraviolet absorption has a band at $$\lambda_{max.}^{EtOH} \ 223 \ m\mu$$

($\epsilon$=13,500) with a shoulder at about 265 m$\mu$ that indicates the presence of a tautomeric form in ethanolic solution.

*Analysis.*—Calcd. for C$_9$H$_5$F$_{12}$N$_3$O: C, 27.08; H, 1.26; F, 57.12; N, 10.53. Found: C, 27.52; H, 1.41; F, 58.14; N, 11.30.

EXAMPLE 31

Tetramethylammonium salt of 4-acetylimino-2,2,5,5-tetrakis(trifluoromethyl)imidazolidine

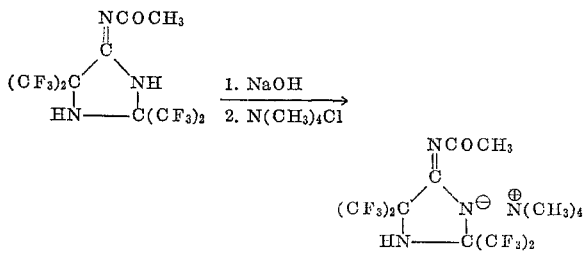

A 10% sodium hydroxide aqueous solution was added dropwise to a suspension of 5.0 g. of 4-acetylimino-2,2,5,5 - tetrakis(trifluoromethyl)imidazolidine in 25 ml. of water until solution was complete. The solution was filtered, and the filtrate was mixed with a solution of 5.0 g. of tetramethylammonium chloride in 10 ml. of water. The crystalline precipitate that formed upon cooling to 0° C. was collected on a filter and then recrystallized from alcohol-ether. There was obtained 4.1 g. of the tetramethylammonium salt as colorless crystals, M.P. 225–227° C. The infrared spectrum showed a strong absorption at 6.44$\mu$.

*Analysis.*—Calcd. for C$_{13}$H$_{16}$F$_{12}$N$_4$O: C, 33.06; H, 3.42; F, 48.28; N, 11.86. Found: C, 33.43; H, 3.69; F, 47.74; N, 11.55.

EXAMPLE 32

4-chloroacetylimino-2,2,5,5-tetrakis(trifluoromethyl)imidazolidine

R=H; X=—COCH$_2$Cl; all Z's=F

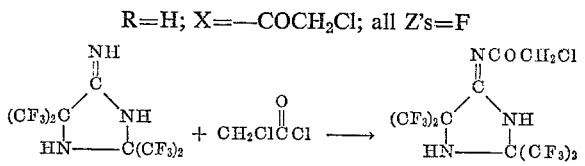

A 5.0 g. sample of 4-imino-2,2,5,5-tetrakis(trifluoromethyl imidazolidine and 25 ml. (excess) of chloroacetyl chloride were refluxed for 3 days, the resulting reaction mixture poured onto ice-water (pentane used to facilitate transfer), and a solid (4 g.) was collected by suction filtration. The solid was recrystallized from ether-pentane giving 1.87 g., M.P. 143–144° C., of 4-chloroacetylimino-2, 2,5,5-tetrakis(trifluoromethyl)imidazolidine. Evaporation of the mother liquors gave 1.98 g. of additional product. The mass spectrum showed a parent peak at m./e. 433 and the expected fragmentation. H$^1$ N.M.R. showed bands at 4.62 p.p.m. (—CH$_2$—), 6.6 p.p.m. (—NH—in the ring)

and 9.6 p.p.m. (—NHCO) from (CH$_3$)$_4$Si used as an internal standard. The F$^{19}$ N.M.R. gave a characteristic pair of septets (J=5 c.p.s.) at +72.2 and 77.5 p.p.m. from ext. FCCl$_3$ at 56.4 mc.

*Analysis.*—Calcd. for C$_9$H$_4$N$_3$OF$_{12}$Cl (432.60): C, 24.88; H, 0.93; N, 9.73; F, 52.6; Cl, 8.20. Found: C, 25.03; H, 1.07; N, 9.48; F, 53.04; Cl, 8.75.

EXAMPLE 33

4-benzoylimino-2,2,5,5-tetrakis(trifluoromethyl)imidazolidine

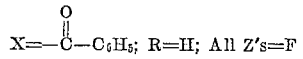

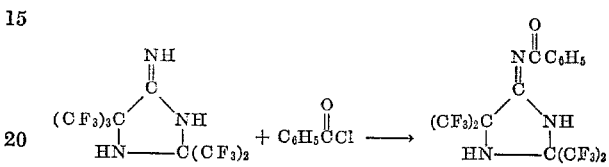

A 1.00 g. sample of 4-imino-2,2,5,5-tetrakis(trifluoromethyl)imidazolidine, 0.410 g. of benzoyl chloride (1 equivalent) and 15 ml. of diethylene glycol dimethyl ether (diglyme) were refluxed for 3 days (most of the hydrogen chloride was given off within a few minutes). The reaction mixture was poured onto ice, diluted with water and extracted with ether. The combined ether extracts were washed with water and dried over magnesium sulfate. Evaporation of the ether gave 0.85 g. of a solid which was recrystallized from ethanol-water giving 0.60 g. of white crystals, M.P. 157.5–159° C., which was 4-benzoylimino - 2,2,5,5 - tetrakis(trifluoromethyl)imidazoline. The mass spectrum showed a parent peak at m./e. 461 and the base peak at m./e. 105 for (COC$_6$H$_5$)$^+$. The H$^1$ N.M.R. was consistent with the proposed structure and the F$^{19}$ N.M.R. showed two multiplets at 72.5 and 77.6 p.p.m. from external FCCl$_3$ at 56.4 mc. The UV showed $\lambda_{max}$ 245 ($\epsilon$=12,700), 263 ($\epsilon$=11,100) m$\mu$.

*Analysis.*—Calcd. for C$_{14}$H$_7$N$_3$OF$_{12}$ (461.22): C, 36.45; H, 1.53; N, 9.12; F, 49.50. Found: C, 36.67; H, 1.59; N, 9.49; F, 49.85.

EXAMPLE 34

4-acetylimino-3-methyl-2,2,5,5-tetrakis(trifluoromethyl)imidazolidine

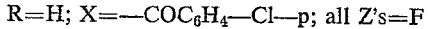

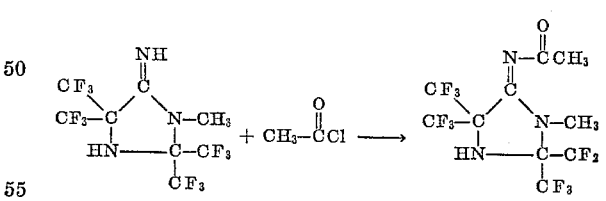

A mixture of 2.0 g. (0.0054 mole) of 4-imino-3-methyl-2,2,5,5 - tetrakis(trifluoromethyl)imidazolidine and 5 ml. of acetyl chloride was heated at reflux for 30 hours and then cooled and poured over ice. The solid that formed was collected on a filter, washed with water, and recrystallized from alcohol-water. There was obtained 1.85 g. (83%) of 4 - acetylimino - 3 - methyl - 2,2,5,5 - tetrakis (trifluoromethyl)imidazolidine as colorless crystals, M.P. 137–139° C. The F$^{19}$ N.M.R. spectrum in CD$_3$CN showed a septet (J=4.2 c.p.s.) at 73.1 p.p.m. and a multiplet at 75.1 p.p.m. from CCl$_3$F used as an internal standard. The H$^1$ N.M.R. spectrum in CD$_3$CN showed a singlet (area 3) at 2.17 p.p.m., a singlet (area 1, NH) at 2.33 p.p.m., and a septet (J$_{HF}$=1 c.p.s.) (area 3) centered at 3.02 p.p.m. lower field from (CH$_3$)$_4$Si used as an internal reference. The ultraviolet spectrum showed $$\lambda_{max.}^{Ethanol} \ 217 \ m\mu$$

($\epsilon$=8300). The infrared spectrum showed bands at 5.75$\mu$ and 6.00$\mu$.

*Analysis.*—Calcd. for $C_{10}H_7F_{12}N_3O$: C, 29.07; H, 1.71; F, 55.18; N, 10.17. Found: C, 29.37; H, 2.01; F, 54.92; N, 10.22.

EXAMPLE 35

Preparation of 4-(p-chlorobenzoylimino)-2,2,5,5-tetrakis(trifluoromethyl)imidazolidine R=H; X=—$COC_6H_4$—Cl—p; all Z's=F

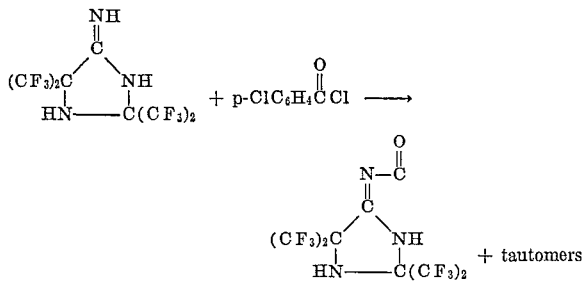

A solution containing 5.0 g. (14.0 mmoles) of 4-imino-2,2,5,5-tetrakis(trifluoromethyl)imidazolidine and 2.5 g. (14.3 mmoles) of p-chlorobenzoyl chloride in 50 ml. of diglyme (diethylene glycol dimethyl ether) was refluxed, under a nitrogen atmosphere, until hydrogen chloride was no longer detected when the condenser outlet adapter was bubbled into silver nitrate solution, 15 hours being required. The cooled reaction solution was poured into 150 ml. of water and the resulting solid was filtered, dissolved in methanol and precipitated with water. The filtered product was dissolved in 75 ml. of diethyl ether and extracted with 5 ml. of 5% sodium bicarbonate. The ether layer was washed with water, dried over anhydrous magnesium sulfate, then filtered. Crystallization from ether-petroleum ether (3:1) mixture, filtering and drying in a vacuum oven at 60° C. for 12 hours gave 3.3 g. of 4-(p-chlorobenzoylimino) - 2,2,5,5-tetrakis(trifluoromethyl)imidazolidine as white crystals, M.P. 139–140° C.

*Analysis.*—Calcd. for $C_{14}H_6ClF_{12}N_3O$: C, 33.93; H, 1.22; Cl, 7.15; F, 46.06; N, 8.48; M.W., 495.57. Found: C, 34.29; H, 1.52; Cl, 7.85; F, 45.33; N, 8.44.

The mass spectrum contained the parent peak at 495 m./e. The $F^{19}$ N.M.R. spectrum, obtained in deuteroacetone with $(CH_3)_4Si$ as internal reference and $FCCl_3$ as external reference, contained four broad bands in equal intensity with centers at 73.3, 74.5, 79.1 and 79.5 p.p.m. The proton N.M.R. spectrum contained a broad band at 6.8 p.p.m. [H—N—(1)]. The $A_2B_2$ pattern for aromatics was centered at 7.78 p.p.m. with $A_2$ part centered at 7.55 p.p.m. (J=8.5 c.p.s.) (2H). The $B_2$ part was centered at 8.05 p.p.m. (J=8.5 c.p.s.) and was distorted by the (NH) which gave a broad band from 7.8 to 10.15 p.p.m. (3H). When trifluoroacetic acid was added the high field (NH) was shifted and appeared as a sharp singlet at 6.72 p.p.m.; the low field (NH) was removed and the aromatics gave a typical $A_2B_2$ pattern centered at 7.78 p.p.m. (J=8.5 c.p.s.) (4H). The ultraviolet spectrum in acetonitrile showed $\lambda_{max.}$=250 m$\mu$ ($\epsilon$=19,330), and in ethanol the spectrum contained two bands at $\lambda_{max.}$ 253, 270 m$\mu$.

EXAMPLE 36

Preparation of 4-(2,4-dichlorobenzoylimino)-2,2,5,5-tetrakis(trifluoromethyl)imidazolidine R=H; X=—$COC_6H_3Cl_2$—2,4; all Z's=F

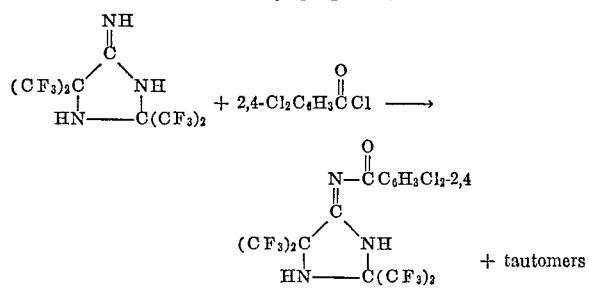

The procedure of Example 35 was repeated with the exceptions that 3.0 g. (14.3 mmoles) of 2,4-dichlorobenzoyl chloride was substituted for the p-chlorobenzoyl chloride of that example and the refluxing of the reaction mixture was continued for 40 hours. There was obtained 4.5 g. of 4-(2,4-dichlorobenzoylimino)-2,2,5,5-tetrakis(trifluoromethyl)imidazolidine as white needles, M.P. 153.4–153.8° C.

*Analysis.*—Calcd. for $C_{14}H_5Cl_2F_{12}N_3O$: C, 31.72; H, 0.95; Cl, 13.38; F, 43.02; N, 7.93; M.W., 530.02. Found: C, 32.40; H, 1.16; Cl, 14.00; F, 42.23; N, 7.79.

The mass spectrum contained the parent peak at 529 m./e., based on the most abundant $Cl^{35}$ ion. The $F^{19}$ N.M.R. spectrum, obtained in deuteroacetone with $(CH_3)_4Si$ as internal reference and with $FCCl_3$ as external reference, contained two broad bands in equal intensity with centers at 73.2 and 78.7 p.p.m. The proton N.M.R. spectrum contained a singlet at 6.56 p.p.m. [H—N—(1)], a multiplet typical of an ABC pattern for aromatics centered at 7.5 p.p.m. (3H), and a broad band at 10.1 p.p.m. (NH), which exchanged with trifluoroacetic acid. The ultraviolet absorption in acetonitrile showed $\lambda_{max.}$=216 m$\mu$ ($\epsilon$=23,400).

EXAMPLE 37

Preparation of 4-(p-methoxybenzoylimino)-2,2,5,5-tetrakis(trifluoromethyl)imidazolidine R=H; X=—$COC_6H_4OCH_3$—p; all Z's=F

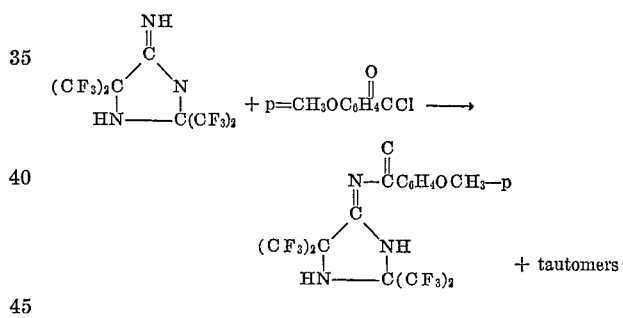

The procedure of Example 35 was repeated with the exceptions that 2.5 g. (14.3 mmoles) of p-methoxybenzoyl chloride was substituted for the p-chlorobenzoyl chloride of that example and the refluxing of the reaction mixture was carried out for 24 hours. There was obtained 2.5 g. of 4 - (p-methoxybenzoylimino)-2,2,5,5-tetrakis(trifluoromethyl)imidazolidine as white crystals, M.P. 122.8–124.2° C.

*Analysis.*—Calcd. for $C_{15}H_9F_{12}N_3O_2$: C, 36.76; H, 1.85; F, 46.54; N, 8.56; M.W., 491.16. Found: C, 37.05; H, 1.89; F, 45.20; N, 8.80.

The mass spectrum contained the parent peak at 491 m./e. The $F^{19}$ N.M.R. spectrum, obtained as described in Example 36, contained four broad bands: two in equal intensity centered at 72.1 and 77.3 p.p.m. and two in equal intensity centered at 73.8 and 78.4 p.p.m. The ratio of the low field set to the high field set was about 5:4, respectively.

The proton N.M.R. spectrum contained a sharp singlet at 3.9 p.p.m. ($CH_3O$), and a broad band centered at 6.7 p.p.m. [H—N—(1)]. The $A_2B_2$ pattern for aromatics was distorted by the low field (NH) which appeared at 7.25 to 9.3 p.p.m. (3H) and included the $B_2$ part appearing as a broad band centered at 8.0 p.p.m. The $A_2$ part was centered at 7.04 p.p.m. (J=9 c.p.s.) (2H). When trifluoroacetic acid was added, the high field (NH) was shifted and appeared as a sharp singlet at 5.65 p.p.m.; the low field (NH) was removed and the aromatics gave a typical $A_2B_2$ pattern centered at 7.5 p.p.m. (J=9 c.p.s.) (4H). The ultraviolet absorption in acetonitrile showed $\lambda_{max.}$=220 mμ (ε=16,800); $\lambda_{max.}$=278 mμ (ε=17,100).

EXAMPLE 38

4-(crotonylimino)-2,2,5,5-tetrakis(trifluoromethyl) imidazolidine

R=H; X=—COCH=CHCH₃; all Z's=F (with isomers and tautomers)

The procedure of Example 35 was repeated with the exceptions that 7.0 g. (19.6 mole) of 4-imino-2,2,5,5-tetrakis(trifluoromethyl)imidazolidine was used, 2.0 g. (20.0 mmoles) of crotonyl chloride was substituted for p-chlorobenzoyl, and the refluxing of the reaction mixture was continued for 63 hr. Fractional recrystallization of 4.8 g. of solid product from chloroform gave cis and trans isomers and a 0.7 g. cis-trans mixture of 4-(crotonylimino) - 2,2,5,5 - tetrakis(trifluoromethyl)imidazolidine as white crystals, M.P. 208.8–213.8° C.

*Analysis.*—Calcd. for $C_{11}H_7F_{12}N_3O$: C, 31.08; H, 1.66; F, 53.64; N, 9.89. Found: C, 30.86; H, 1.73; F, 53.13; N, 9.68 for cis/trans mixture.

The infrared, proton and fluorine N.M.R. spectra were consistent.

EXAMPLE 39

4-(heptanoylimino)-2,2,5,5-tetrakis(trifluoromethyl) imidazolidine (and tautomers)

R=H; X= —CO(CH₂)₅CH₃; all Z's=F

The procedure of Example 38 was repeated with the exception that 3 g. (20 mmole) of n-heptanoyl chloride was substituted for the crotonyl chloride of that example. Recrystallization of 5.5 g. of solid product from chloroform gave 1.6 g. of 4-(heptanoylimino)-2,2,5,5-tetrakis (trifluoromethyl)imidazolidine as white needles, M.P. 87.5–88.0° C.

*Analysis.*—Calcd. for $C_{14}H_{15}F_{12}N_3O$: C, 35.85; H, 3.22; F, 48.82; N, 8.96. Found: C, 35.49; H, 3.13; F, 48.06; N, 8.69.

The infrared, proton and fluorine N.M.R. spectra were consistent.

EXAMPLE 40

4-(dichloroacetylimino)-2,2,5,5-tetrakis(trifluoromethyl) imidazolidine (and tautomers)

R=H; X=—COCHCl₂; all Z's=F

The procedure of Example 38 was repeated with the exception that 25 ml. of dichloroacetyl chloride was substituted for the crotonyl chloride of that example. Recrystallization of 6 g. of solid product from ether/pentane gave 1 g. of 4-(dichloroacetylimino)-2,2,5,5-tetrakis(trifluoromethyl)imidazolidine as white crystals, M.P. 100.2–101.2° C. (sealed cap.).

*Analysis.*—Calcd. for $C_9H_3F_{12}Cl_2N_3O$: C, 23.10; H, 0.64; Cl, 15.15; F, 48.72; N, 8.98; M.W., 468.06. Found: C, 22.95; H, 0.63; Cl, 14.91; F, 47.71; N, 8.95

The mass spectrum contained the parent peak at 467 m./e., based on the most abundant Cl³⁵ ion.

The infrared, ultraviolet and N.M.R. spectra were consistent and indicated tautomers.

EXAMPLE 41

4-(2,4-dichlorophenoxyacetylimino)-2,2,5,5-tetrakis (trifluoromethyl)imidazolidine (and tautomers)

R=H; X=—COCH₂OC₆H₃Cl₂-2,4; all Z's=F

The procedure of Example 35 was repeated with the exceptions that 3.5 g. (14.6 mmole) of 2,4-dichlorophenoxyacetyl chloride was substituted for the p-chlorobenzoyl chloride of that example and the refluxing of the reaction mixture was continued for 24 hours. There was obtained 2.0 g. of 4-(2,4-dichlorophenoxyacetyl)-2,2,5,5-tetrakis(trifluoromethyl)imidazolidine as white crystals, M.P. 197–197.9° C.

*Analysis.*—Calcd. for $C_{15}H_7Cl_2F_{12}N_3O_2$: C, 32.17; H, 1.26; F, 40.72; N, 7.50; M.W., 560.051. Found: C, 32.36; H, 1.32; F, 39.69; N, 7.02.

The mass spectrum contained the parent peak at 559 m./e. based on most abundant Cl³⁵ ion. The infrared and N.M.R. spectra were consistent; the ultraviolet spectra indicated tautomerization.

When the procedures described in Examples 30 and 32–41 are carried out with appropriate acid chlorides substituted for the specific acid chlorides of those examples, the following acyl derivatives of 4-imino-2,2,5,5-tetrakis (polyfluoromethyl)imidazolidines can be prepared:

4-propionylimino-2,2,5,5-tetrakis(difluoromethyl) imidazolidine;
4-octanoylimino-3-methyl-2,2,5,5-tetrakis(trifluoromethyl)imidazolidine;
4-undecanoylimino-2,2,5,5-tetrakis(trifluoromethyl) imidazolidine;
4-trifluoroacetylimino-2,2,5,5-tetrakis(trifluoromethyl)imidazolidine;
4-(3-chlorobutyryl)imino-2,2,5,5-tetrakis(chlorodifluoromethyl)imidazolidine;
4-(2-bromopropionyl)imino-2,2,5,5-tetrakis(trifluoromethyl)imidazolidine;
4-methoxyacetylimino-2,5-bis(difluoromethyl)-2,5-bis(trifluoromethyl)imidazolidine;
4-butoxyacetylimino-2,5-bis(chlorodifluoromethyl)-2,5-bis(trifluoromethyl)imidazolidine;
4-(β-ethoxypropionyl)imino-2,2,5,5-tetrakis(trifluoromethyl)imidazolidine;
4-naphthoylimino-2,2,5,5-tetrakis(trifluoromethyl) imidazolidine;
4-(p-fluorobenzoyl)imino-2,2,5,5-tetrakis(trifluoromethyl)imidazolidine;
4-(2,4,6-trichlorobenzoyl)imino-2,2,5,5-tetrakis(trifluoromethyl)imidazolidine;
4-(p-bromobenzoyl)imino-2,2,5,5-tetrakis(trifluoromethyl)imidazolidine;
4-(2,4-diethylbenzoyl)imino-2,2,5,5-tetrakis(trifluoromethyl)imidazolidine;
4-cumoylimino-2,2,5,5-tetrakis(trifluoromethyl) imidazolidine;
4-(p-methoxybenzoyl)imino-2,2,5,5-tetrakis(trifluoromethyl)imidazolidine; and
4-(p-butoxybenzoyl)imino-2,2,5,5-tetrakis(trifluoromethyl)imidazolidine.

When amino- or alkyl-substituted aminoacyl derivatives are desired, they can be prepared by first reacting the 4-imino - 2,2,5,5 - tetrakis(polyfluoromethyl)imidazolidine with a nitroacyl chloride to form the corresponding 4-nitroacylimino - 2,2,5,5 - tetrakis(polyfluoromethyl) imidazolidine. This nitroacyl derivative can then be reduced by treatment with hydrogen in the presence of a hydrogenation catalyst such as platinum to form the aminoacylimino - 2,2,5,5 - tetrakis(polyfluoromethyl)imidazolidine. The alkyl- and dialkylaminoacylimidazolidine can be prepared by alkylating the 4-aminoacylimino-2,2,5,5-tetrakis(polyfluoromethyl)imidazoline with alkylating agents having alkyl moieties of 1–4 carbon atoms such as dimethyl sulfate. The following aminoacyl derivatives of 4-imino - 2,2,5,5 - tetrakis(polyfluoromethyl)imidazolidine can be prepared in this manner:

4-(aminoacetylimino)-2,2,5,5-tetrakis(trifluoromethyl) imidazolidine;
4-(α-aminopropionyl)imino-2,2,5,5-tetrakis(chlorodifluoromethyl)imidazolidine;
4-butylaminoacetylimino-2,2,5,5-tetrakis(difluoromethyl)imidazolidine;

4-[α-(dipropylamino)propionyl]imino-2,2,5,5-tetrakis (trifluoromethyl)imidazoline;

4-(p-aminobenzoyl)imino-2,5-bis(chlorodifluoromethyl)-2,5-bis(trifluoromethyl)imidazolidine;

4-(p-butylaminobenzoyl)imino-2,2,5,5-tetrakis (trifluoromethyl(imidazolidine; and 4-(p-diethylaminobenzoyl)imino-2,5-bis(difluoromethyl)-2,5-bis(trifluoromethyl)imidazolidine.

EXAMPLE 42

Preparation of 4-[N-(p-methoxyphenyl)carbamoylimino] 2,2,5,5-tetrakis(trifluoromethyl)imidazolidine R=H; X=—CONH—$C_6H_4OCH_3$—p; all Z's=F

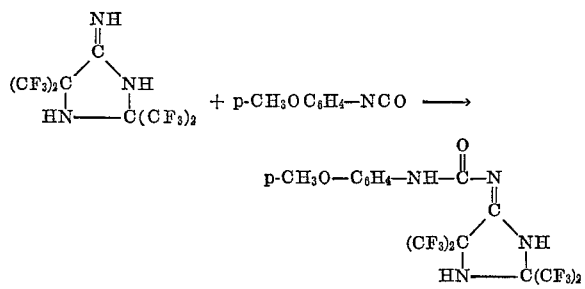

A solution containing 5.0 g. (14 mmoles) of 4-imino-2,2,5,5-tetrakis(trifluoromethyl)imidazolidine and 2.1 g. (14 mmoles) of p-methoxyphenyl isocyanate in 25 ml. of xylene was refluxed for 36 hours under a nitrogen atmosphere. The solid, filtered from the cooled reaction mixture, was recrystallized from aqueous methanol. After filtering and drying in a vacuum oven at 60° C. for 12 hours, there was obtained 2.3 g. of 4-[N-(p-methoxyphenyl)carbamoylimino] - 2,2,5,5 - tetrakis(trifluoromethyl)imidazolidine as white crystals, M.P. 186–187° C.

*Analysis.*—Calcd. for $C_{15}H_{10}F_{12}N_4O_2$: C, 35.58; H, 2.00; F, 45.06; N, 11.97. Found: C, 36.23; H, 2.13; F, 44.84; N, 11.24.

The $F^{19}$ N.M.R. spectrum in deuteroacetone, external $CCl_3F$, contained two broad bands centered at 72.4 and 77.8 p.p.m. The proton N.M.R. spectrum in trifluoroacetic anhydride, external $(CH_3)_4Si$, contained a sharp singlet at 3.25 p.p.m. ($CH_3O$), singlet at 3.48 p.p.m.

[H—N—(1)]

an $A_2B_2$ pattern centered at 6.66 p.p.m. (J=9 c.p.s.) for the aromatics (4H), and a broad band centered at 10.6 p.p.m. (2 NH). When $D_2O$ was added, the high and low field (NH) peaks disappeared.

When the procedure of Example 42 is repeated with the appropriate alkyl, aryl or substituted aryl isocyanates substituted for the p-methoxyphenyl isocyanate of that example, the following carbamoyliminoimidazolidines can be obtained:

4-(N-methylcarbamoylimino)-2,2,5,5-tetrakis(difluoromethyl)imidazolidine;

4-(N-butylcarbamoylimino)-2,2,5,5-tetrakis(trifluoromethyl)imidazolidine;

4-(N-phenylcarbamoylimino)-2,2,5,5-tetrakis(chlorodifluoromethyl)imidazolidine;

4-(N-naphthylcarbamoylimino)-2,2,5,5-tetrakis(trifluoromethyl)imidazolidine;

4-[N-(p-ethoxyphenyl)carbamoylimino]-2,5-bis(difluoromethyl)-2,5-bis(trifluoromethyl)imidazolidine;

4-[N-(p-ethylphenyl)carbamoylimino]-2,2,5,5-tetrakis(trifluoromethyl)imidazolidine; and 4-[N-(2,4-dichlorophenyl)carbamoylimino]-2,5-bis (chlorodifluoromethyl)-2,5-bis(trifluoromethyl) imidazolidine.

EXAMPLE 43

4-(carbethoxyimino)-2,2,5,5-tetrakis(trifluoromethyl)imidazolidine

R=H; X=$COOCH_2CH_3$; all Z's=F

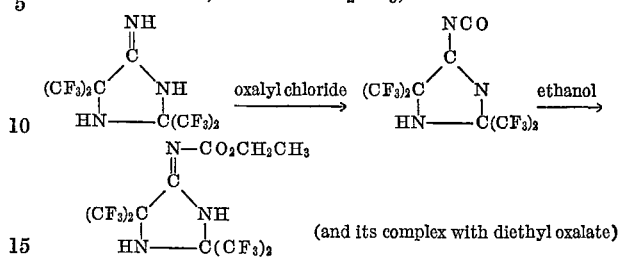

(and its complex with diethyl oxalate)

A 5.0 g. sample of 4-imino-2,2,5,5-tetrakis(trifluoromethyl)imidazolidine dissolved in 20 ml. of glyme (ethylene glycol dimethyl ether) was added over 0.5 hour to 4.0 ml. of oxalyl chloride (excess) in 20 ml. of glyme (yellow color). After the addition was complete the infrared spectrum of the reaction mixture showed no bands in the isocyanate region. After stirring at room temperature for 20 minutes, a weak band at 4.41μ appeared in the infrared indicating the formation of 4-isocyanato-2,2,5,5-tetrakis(trifluoromethyl)-3-imidazoline. After refluxing for 30 minutes, the yellow color had completely disappeared and the infrared spectrum now showed a strong isocyanate band at 4.41μ. After another 15 minutes of reflux, 10 ml. of absolute ethanol was added (infrared analysis showed the absence of the isocyanate band indicating that the isocyanate had reacted with ethanol). Evaporation of the glyme and excess ethanol under reduced pressure gave a white semisolid which on washing with pentane gave 4.82 g. of a white solid, M.P. 70–120° C. The pentane wash was concentrated to give 0.48 g. of a second crop, M.P. 50–89° C., which was shown to be a 1:1 complex of the desired carboethoxyimine and diethyl oxalate (formed from the excess oxalyl chloride and ethanol). $H^1$ N.M.R. (acetone —$d_6$) showed NH bands at 6.48 p.p.m. (area 1) and 10.23 p.p.m. (area 1), $CH_2$ bands (quartets) at 4.29 p.p.m. (area 4; J=7) and 4.21 p.p.m. (area 2; J=7.5) and $CH_3$ bands (triplets) at 1.30 p.p.m. (area 4; J=7) and 1.27 p.p.m. (area 2; J=7.5).

*Analysis.*—Calcd. for $C_{16}H_{17}N_3O_6F_{12}$ (575.32): C, 33.40; H, 2.98; N, 7.31. Found: C, 32.30; H, 2.89; N, 7.48.

The original pentane-washed solid was recrystallized from ether-pentane to give 0.86 g. of white solid, M.P. 122–124° C., which was the uncomplexed carbethoxyimine. $H^1$ n.m.r. showed a $CH_3$ triplet (J=7.0) at 1.27 p.p.m. and a $CH_2$ quartet (J=7.0) at 4.23 p.p.m. and NH bands at 6.48 p.p.m. and 9.22 p.p.m. lower field from $(CH_3)_4Si$ used as an internal reference.

*Analysis.*—Calcd. for $C_{10}H_7N_3O_2F_{12}$ (429.18): C, 27.99; H, 1.64; N, 9.80; F, 53.1. Found: C, 28.25; H, 1.95; N, 9.87; F, 53.24.

The 4-isocyanato-2,2,5,5 - tetrakis(trifluoromethyl)-3-imidazoline formed as an intermediate in the process of Example 43 can be isolated, if desired, by carrying out the first step of the process of that example as follows:

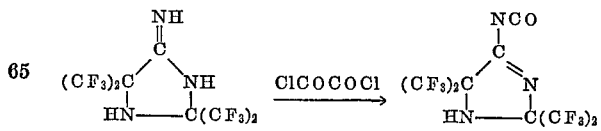

Essentially anhydrous conditions were maintained. A three-necked flask attached to the bottom of a spinning band fractionating colum was equipped with a magnetic stirrer, nitrogen inlet and dropping funnel. The equipment was flame-dried, cooled and 15 ml. of oxalyl chloride and 75 ml. of anhydrous diethyl ether were introduced into the flask under positive nitrogen pressure. Then a solution of 30 g. of 4-imino-2,2,5,5-tetrakis(trifluoromethyl)-imidazolidine dissolved in 100 ml. of ether was added over 30 minutes with vigorous stirring. After stirring an additional 20 minutes, the ether was removed by distillation at a moderate rate and the residue distilled at 75 mm. The product, 4-isocyanato-2,2,5,5-tetrakis (trifluoromethyl)-3-imidazoline, B.P. 78° C. (75 mm.), 25.7 g., was collected in oven-dried vials (as it reacts with moist air). $H^1$ N.M.R. showed a singlet (broad) at 3.6 p.p.m. $F^{19}$ N.M.R. showed a pair of septets (J=5) at +73.3 and +78.0 p.p.m. from external $FCCl_3$ at 56.4 M.

*Analysis.*—Calcd. for $C_8HN_3OF_{12}$ (383.12): C, 25.08; H, 0.26; N, 10.96. Found: C, 25.58; H, 0.77; N, 11.51.

When the process of Example 43 is repeated with other alcohols substituted for the ethanol used to react with the isocyanate intermediate formed in that example, the following carbalkoxyiminoimidazolidines can be obtained:

4-carbocyclohexoxyimino-2,2,5,5-tetrakis(trifluoromethyl)imidazoline; and 4-carbobutoxyimino-2,2,5,5-tetrakis(trifluoromethyl)imidazolidine.

These derivatives can also be obtained in the form of their dialkyl oxalate complexes.

EXAMPLE 44

4-(carbomethoxyimino)-2,2,5,5-tetrakis(trifluoromethyl)-imidazolidine

R=H; X=—$COOCH_3$; all Z's=F

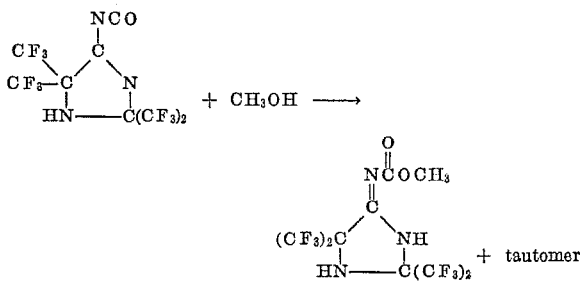

A 25-ml. sample (excess) of methanol was mixed at room temperature with a 6.2-g. portion of 4-isocyanato-2,2,5,5-tetrakis(trifluoromethyl)-3-imidazoline dissolved in 100 ml. of ether. Evaporation of the reaction mixture to dryness gave 6.98 g. of a white solid, M.P. 116–120° C. Recrystallization of one-half of this material from methanol-water gave 2.56 g. (76%) of the urethan product, M.P. 125–129° C. This material did not absorb in the ultraviolet above 210 mμ. The $H^1$ N.M.R. showed —$OCH_3$ absorption at τ 6.20 and NH bands at τ 3.5 and τ 0.2. $F^{19}$ N.M.R. showed a pair of septets (J=5) at 72.1 and 75.6 p.p.m. from ext. $FCCl_3$.

*Analysis.*—Calcd. for $C_9H_5N_3O_2F_{12}$ (415.15): C, 26.04; H, 1.21; N, 10.13; F, 54.92. Found: C, 26.30; H, 1.39; N, 10.44; F, 53.65.

EXAMPLE 45

4-(2-dimethylaminoethoxycarbonylimino)-2,2,5,5-tetrakis-(trifluoromethyl)imidazolidine R=H; X=—$COOCH_2CH_2N(CH_3)_2$; all Z's=F

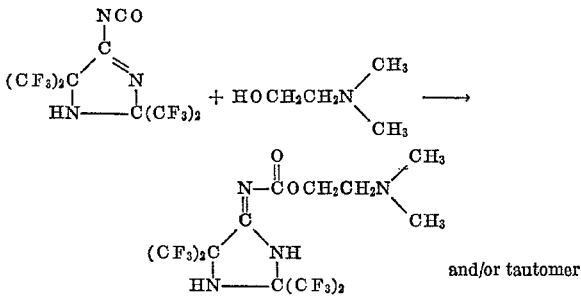

A 6.2 g. sample of 4-isocyanato-2,2,5,5-tetrakis-(trifluoromethyl)-3-imidazoline was added at room temperature to 1.44 g. (1 equiv.) of dimethylaminoethanol dissolved in 100 ml. of ether. An exothermic reaction took place and in a few minutes a white precipitate formed. The solid was collected and washed with ether, 4.74 g. (62%) M.P. 136–141° C. The $H^1$ N.M.R. showed NH bands at τ 1.0 and 4.48, —$OCH_2$— at τ 5.6 and —$CH_2N$ at τ 6.6 forming an $A_2B_2$ pattern (J=6) and —$N(CH_3)_2$ at τ 7.1. The $F^{19}$ N.M.R. showed a pair of septets (J=5) at 71.7 and 76.9 p.p.m. for int. $FCCl_3$. The ultraviolet spectrum showed λ_max 252 mμ (k=27.2 in $CH_3CN$ and 11.7 in ethanol), indicating a tautomeric mixture. The hydrochloride was prepared and found to be water soluble.

*Analysis.*—Calcd. for $C_{12}H_{12}N_4O_2F_{12}$ (472.25): C, 30.52; H, 2.56; N, 11.87; F, 48.4. Found: C, 30.92; H, 2.82; N, 12.14; F, 48.94.

EXAMPLE 46

4-(ethylthiocarbonylimino)-2,2,5,5-tetrakis(trifluoromethyl)imidazolidine

R=H; X=—$COSCH_2CH_3$; all Z's=F

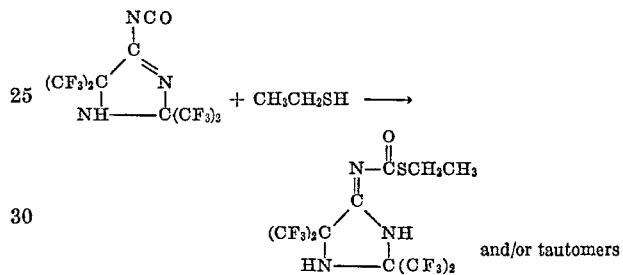

The reaction mixture obtained by adding 6.2 g. of 4-isocyanato-2,2,5,5 - tetrakis(trifluoromethyl)-3 - imidazoline to 5 g. (excess) of ethyl mercaptan dissolved in 100 ml. of ether was evaporated to dryness giving 5.6 g. (76%) of a white solid product, M.P. 115–117° C. The $H^1$ N.M.R. showed NH bands at τ 0.4 and 3.5, a —$CH_2CH_3$ triplet at τ 8.73 (J=8), and a —$CH_2CH_3$ quartet at τ 7.09 (J=8). The infrared spectrum showed a band at 6.2μ. The $F^{19}$ N.M.R. showed multiplets at 71.3 and 76.6 p.p.m. from int. $FCCl_3$.

*Analysis.*—Calcd. for $C_{10}H_7N_3OSF_{12}$ (445.25): C, 26.97; H, 1.59; N, 9.44; S, 7.21; F, 51.2. Found: C, 27.11; H, 1.75; N, 9.50; S, 6.88; F, 51.09.

When the process of Example 43 is repeated with primary or secondary amines substituted for the ethanol used in that example, the following carbamylinoimidazolidines can be obtained:

4-[N-(cyclohexyl)carbamoyl]imino-2,2,5,5-tetrakis(trifluoromethyl)imidazolidine;

4-[N-(β-hydroxyethyl)carbamoyl]imino-2,2,5,5-tetrakis(trifluoromethyl)imidazolidine; and 4-[N-(β-dimethylaminoethyl)carbamoyl]imino-2,2,5,5-tetrakis(trifluoromethyl)imidazolidine Other carbamoyliminoimidazolidines are illustrated in Examples 47–49.

EXAMPLE 47

4-(morpholinocarbonyl)imino-2,2,5,5-tetrakis(trifluoromethyl)imidazolidine

R=H; X=N-morpholinocarbonyl; all Z's=F

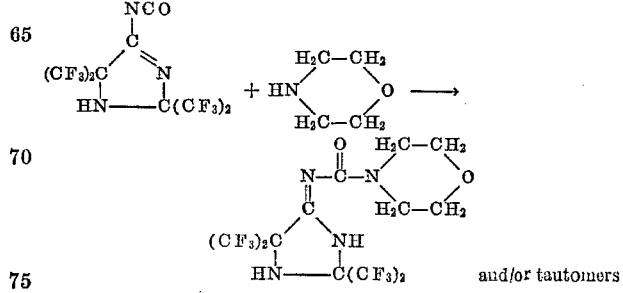

A 6.2 g. (0.0162 mole) sample of 4-isocyanato-2,2,5,5-tetrakis(trifluoromethyl)-3-imidazoline was added at room temperature to 1.40 g. (0.0162 mole) of morpholine dissolved in 100 ml. of ether. An exothermic reaction occurred. The product, 6.63 g., M.P. 64–72° C., was obtained by evaporation. One-half of this material was vacuum sublimed giving 2.87 g. (84%) of white solid, M.P. 98–113° C. The $H^1$ N.M.R. of the product showed NH bands at $\tau$ 3.25 and 0.9 and ring $CH_2$'s at $\tau$ 6.35. The $F^{19}$ N.M.R. showed multiplets at 70.8 and 77.3 p.p.m. from ext. $FCCl_3$. The mass spectrum did not show a parent but gave good evidence for the morpholino fragment. The U.V. spectrum showed $$\lambda^{CH_3CN}_{max.} 250$$

($\epsilon$=7,900) and 227 m$\mu$ ($\epsilon$=9,700) suggesting tautomers.

*Anal.*—Calcd. for $C_{12}H_{10}N_4O_2F_{12}$ (470.23): C, 30.65; H, 2.14; F, 48.49; N, 11.92. Found: C, 29.88; H, 2.13; F, 49.27; N, 12.12.

EXAMPLE 48

4-N-(p-dimethylaminophenyl)carbamoylimino-2,2,5,5-tetrakis(trifluoromethyl)imidazolidine
R=H; X=—CONHC$_6$H$_4$N(CH$_3$)$_2$; all Z's=F

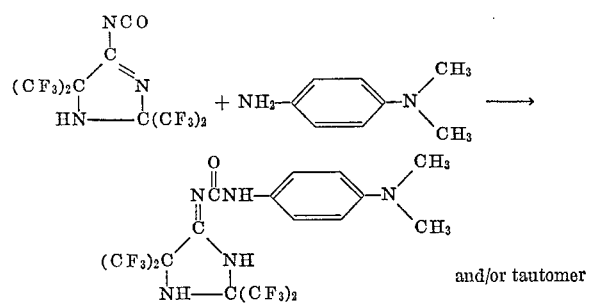

A 2.8-g. sample (0.00734 mole) of 4-isocyanato-2,2,5,5-tetrakis(trifluoromethyl)-3-imidazoline was added in one portion to a solution of 3.80 g. (0.0278 mole) of p-dimethylaminoaniline dissolved in 100 ml. of ether. An exothermic reaction occurred. Evaporation of the ether gave a white solid which was dissolved in 7 ml. of 3 N hydrochloric acid and ice-water. Ether extraction and washing (water) and drying (magnesium sulfate) the ether extracts led to 2.4 g. (63%), M.P. 177–179° C., of the desired product. The $F^{19}$ N.M.R. showed a pair of septets (J=5) at 71.2 and 76.8 p.p.m. from int. $FCCl_3$. $H^1$ N.M.R. showed N(CH$_3$)$_2$ at $\tau$ 7.10 and aromatic A$_2$B$_2$ pattern centered at $\tau$ 3.1, NH bands at $\tau$ 3.3 and 0.1 and an NH band at lower field which could only be seen in the integration of the spectrum. The U.V. spectrum showed $$\lambda^{ethanol}_{max.} 300$$

($\epsilon$=10,900), 254 m$\mu$ ($\epsilon$=10,500).

*Anal.*—Calcd. for $C_{16}H_{13}N_5OF_{12}$ (519.32): C, 37.01; H, 2.52; N, 13.49; F, 43.8. Found: C, 38.15; H, 2.84; N, 12.83; F, 44.13.

EXAMPLE 49

4-N-(diisopropyl)carbamoylimino-2,2,5,5-tetrakis(trifluoromethyl)imidazolidine

R=H; X=—CON[CH(CH$_3$)$_2$]$_2$; all Z's=F

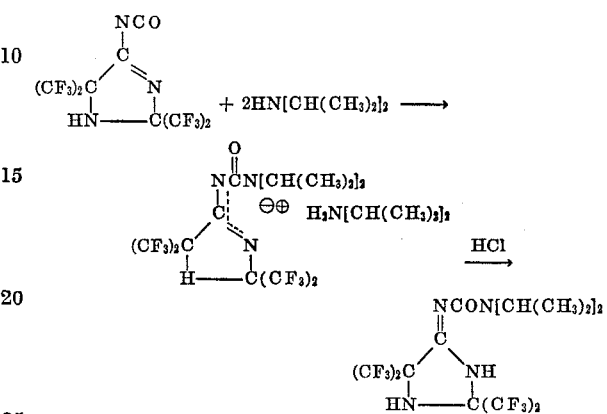

A 1.9 g. sample of 4-isocyanato-2,2,5,5-tetrakis(trifluoromethyl)-3-imidazoline was added in one portion at room temperature to 7.5 g. (huge excess) of diisopropylamine dissolved in 100 ml. of ether. After an exothermic reaction had occurred, the ether and excess amine were evaporated giving 2.6 g. (84%) of the diisopropylammonium salt of the desired product, M.P. 76–81° C. (dec.). The $F^{19}$ N.M.R. showed a pair of septets (J=4) at 71.8 and 76.7 p.p.m. from int. $FCCl_3$. The $H^1$ N.M.R. showed two doublets at $\tau$ 8.78 and 8.82 (J=14.5 and 13 respectively) of equal area for the —CH(CH$_3$)$_2$ groups, two septets at $\tau$ 6.76 (J=13) and 5.8 (broadened) for the —CH absorption, a peak of area 1 at $\tau$ 4.4 for the ring NH and a peak of area 2 at $\tau$ 3.3 for the H$_2$N$^+$ absorption.

*Anal.*—Calcd. for $C_{20}H_{31}N_5OF_{12}$ (585.49): C, 41.03; H, 5.34; N, 11.97; F, 38.9. Found: C, 40.55; H, 5.15; N, 11.80; F, 41.75.

Acidification of a sample of the above salt with 3 N hydrochloric acid-ice gave a white solid which was isolated by ether extraction, M.P. 123–126° C. The $H^1$ N.M.R. spectrum showed a doublet (J=14) at $\tau$ 8.73 for —CH(CH$_3$)$_2$, a septet at $\tau$ 5.77 (J=14) for —CH and singlets at $\tau$ 3.3 and 0.3 for NH absorption. The U.V. showed $$\lambda^{ethanol}_{max.} 250$$

($\epsilon$=8,400), 226 m$\mu$ ($\epsilon$=10,900);

$$\lambda^{CH_3CN}_{max.} 247$$

($\epsilon$=7,600), 222 m$\mu$ ($\epsilon$=10,000). The $F^{19}$ N.M.R. showed a pair of septets at 73.7 and 77.8 p.p.m. from int. $FCCl_3$.

*Anal.*—Calcd. for $C_{14}H_{16}N_4F_{12}O$ (484.30): C, 34.72; H, 3.33; N, 11.57; F, 47.1. Found: C, 34.60; H, 3.41; N, 11.64; F, 47.18.

EXAMPLE 50

4-isocyanato-2,2,5,5-tetrakis(trifluoromethyl)-3-imidazoline cholesterol adduct

R=H; X=—COOC$_{27}$H$_{45}$; all Z's=F

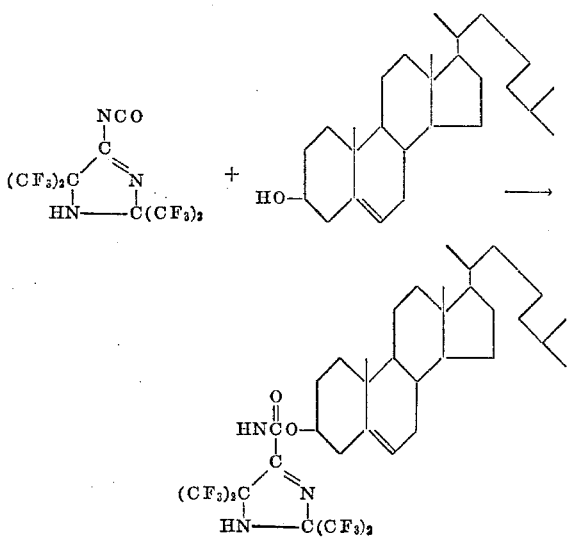

A 7 g. sample of freshly prepared 4-isocyanato-2,2,5,5-tetrakis(trifluoromethyl)-3-imidazoline was distilled into a solution of 7.7 g. of dry cholesterol dissolved in ca. 70 ml. of glyme (ethylene glycol dimethyl ether). The residue was removed by evaporation under reduced pressure and the residue was sublimed giving 11.3 g. (77%) of adduct, M.P. 169–172° C. The F$^{19}$ N.M.R. showed a pair of multiplets at 71.8 and 77.1 p.p.m from ext. FCCl$_3$.

*Analysis.*—Calcd. for C$_{35}$H$_{47}$N$_3$F$_{12}$O$_2$ (769.76): C, 54.61; H, 6.14; N, 6.26; F, 29.6. Found: C, 55.58; H, 6.25; N. 5.54; F, 28.13.

Many of the imidazolidines and 3-imidazolines of the invention are stable in contact with metal surfaces such as iron, steel, stainless steel, nickel and copper, even at elevated temperatures, and can therefore be employed in applications which involve prolonged contact with these metals. Such applications include heat exchange fluids and high temperature hydraulic fluids. The stability of these imidazolidines is illustrated by the following experiments:

EXAMPLE A

A 0.5 g. sample of 4-imino-2,2,5,5-tetrakis(trifluoromethyl)imidazolidine was sealed with an iron wire and a copper wire in a glass tube and was heated at 437° F. for 44 hours. No change in either the fluid or the metal wires was observed during this period.

EXAMPLE B

A 0.5 g. sample of 3-methyl-4-methylimino-2,2,5,5-tetrakis(trifluoromethyl)imidazolidine was sealed with an iron wire and a copper wire in a glass tube and heated at 437° F. for 20 hours. No change in either the fluid or the metal wires was observed during this period.

EXAMPLE C

A 0.5 g. sample of 4-acetylimino-2,2,5,5-tetrakis(trifluoromethyl)imidazolidine was sealed with a copper wire in a glass tube and heated at 437° F. for 20 hours. No change in either the fluid or the copper wire was observed during this time.

All the compounds of this invention are useful for modifying polymers. Such modifications include lowering the forming temperatures or pressures, or plasticizing the polymers.

The modification of poly(methyl methacrylate) resin is illustrated by the following experiment:

EXAMPLE D

The following compositions were prepared:

(a) A mixture of 0.5 g. of poly(methyl methacrylate) resin and 0.1 g. of 4-imino-2,2,5,5-tetrakis(trifluoromethyl)imidazolidine.

(b) A mixture of 0.5 g. of poly(methyl methacrylate) resin and 0.1 g. of 4-acetylimino-2,2,5,5-tetrakis(trifluoromethyl)imidazolidine.

(c) A mixture of 0.5 g. of poly(methyl methacrylate) resin and 0.1 g. of 3-methyl-4-methylimino-2,2,5,5-tetrakis(trifluoromethyl)imidazolidine.

(d) A mixture of 0.5 g. of poly(methyl methacrylate) resin of 0.1 g. of 4-imino-2,2,5,5-tetrakis(chlorodifluoromethyl)imidazolidine.

(e) A mixture of 0.5 g. of poly(methyl methacrylate) resin and 0.1 g. of 4-benzylamino-2,2,5,5-tetrakis (trifluoromethyl)-3-imidazoline.

(f) A mixture of 0.5 g. of poly(methyl methacrylate) resin without additives.

Circular films were pressed from a compact pile of each composition at 150° C. and 5000 lbs. ram pressure for 10 seconds.

The film pressed from composition (a) was 9 mils thick and 2 inches in diameter.

The film pressed from composition (b) was 11 mils thick and 1⅞ inches in diameter.

The film pressed from composition (c) was 11.5 mils thick and 1¾ inches in diameter.

The film pressed from composition (d) was 7 mils thick and 2 inches in diameter.

The film pressed from composition (e) was 8.5 mils thick and 2⅛ inches in diameter.

The film pressed from composition (f) was 18.5 mils thick, only 1⅜ inches in diameter, and was incompletely coalesced around the edges.

This experiment shows that the forming temperatures or pressures for poly(methyl methacrylate) resin are lowered by the addition of the imidazolidines of this invention.

An excellent method for demonstrating muscle-relaxant activity is the use of the 30° Inclined Screen Test of L. O. Randall et al. [J. Pharm. Exp. Therap., 129, 163 (1960)]. This test determines the oral dose which causes 50% of the test animals (mice) to loose their footing on a wire mesh which is inclined 30° from the horizontal. This is called the "paralyzing dose$_{50}$" or PD$_{50}$ value. In this test, low PD$_{50}$ values indicate high potencies.

Another excellent method for demonstrating muscle relaxant activity is the Wire Lift Test. The forefeet of albino mice are placed on a taut wire stretched at a level of approximately 12 inches over a flat surface. Normal animals grasp the wire and lift their hind feet to the wire, where balance is maintained. Inability to lift the hind legs to the wire is taken as a positive response and is considered to be a measure of muscle relaxation. This test determines the oral dose which imparts to 50% of the test animals (mice) an inability to lift their hind legs to the wire, and which is called the "effective dose$_{50}$" or ED$_{50}$ value. Dose response relationships are determined by the method of L. C. Miller and M. L. Tainter, Proc. Soc. Exp. Biol. Med. 57, 261–264 (1944).

The following table gives PD$_{50}$ and ED$_{50}$ values for representative compounds of this invention.

TABLE.—RESULTS OF TESTS FOR MUSCLE RELAXANT ACTIVITY

| Product of Example No. | Compound | Inclined screen $PD_{50}$ (mg./kg.) | Wire lift $ED_{50}$ (mg./kg.) |
|---|---|---|---|
| 1-B, 2 | 4-imino-2,2,5,5-tetrakis (trifluoromethyl)imidazolidine. | 10.6±0.9 | 7.0±0.51 |
| 5 | 4-imino-2,5-bis(difluoromethyl)-2,5-bis(trifluoromethyl)imidazolidine. | 17.3±1.3 | 10.0±0.8 |
| 7 | 4-imino-3-methyl-2,2,5,5-tetrakis-(trifluoromethyl)-imidazolidine. | 20.5±1.7 | 13.0±1.3 |
| 7 | 3-methyl-4-methylimino-2,2,5,5-tetrakis(trifluoromethyl)imidazolidine. | 30.0±3.3 | 19.5±2.3 |
| 8 | 3-ethyl-4-imino-2,2,5,5-tetrakis-(trifluoromethyl)imidazolidine. | 17.0±1.4 | 12.3±1.0 |
| 10 | 3-ethyl-4-ethylimino-2,2,5,5-tetrakis(trifluoromethyl)imidazolidine. | 57.0±14.0 | 30.0±3.9 |
| 10 | 4-ethylamino-2,2,5,5-tetrakis(trifluoromethyl)-3-imidazoline. | 17.5±2.4 | 8.3±0.75 |
| 11 | 3-ethyl-4-methylimino-2,2,5,5-tetrakis(trifluoromethyl)-imidazolidine. | | 30.0±3.3 |
| 12 | 4-ethylimino-3-methyl-2,2,5,5-tetrakis(trifluoromethyl)imidazolidine. | | 22.0±1.6 |
| 13 | 4-benzylamino-2,2,5,5-tetrakis (trifluoromethyl)-3-imidazoline. | 45.0±7.6 | 30.0±5.4 |
| 15 | 4-allylamino-2,2,5,5-tetrakis-(trifluoromethyl)-3-imidazoline. | 41.0±4.8 | 28.0±3.0 |
| 16 | 4-methylamino-2,2,5,5-tetrakis-(trifluoromethyl)-3-imidazoline. | 18.8±1.3 | 10.8±0.86 |
| 20 | 4-hydroxymethylamino-2,2,5,5-tetrakis(trifluoromethyl)-3-imidazoline. | 13.2±1.6 | 5.6±0.85 |
| 21 | 4-(hydroxymethoxymethylamino)-2,2,5,5-tetrakis(trifluoromethyl)-3-imidazoline. | 16.0±1.3 | 7.6±1.0 |
| 23 | 4-(N-pyrrolidylmethylamino)-2,2,5,5-tetrakis(trifluoromethyl)-3-imidazoline hydrochloride. | 18.8±1.7 | 10.5±0.7 |
| 26 | 4-dimethylaminomethylamino-2,2,5,5-tetrakis(trifluoromethyl)-3-imidazoline. | 22.0±1.8 | 10.0±1.1 |
| 27 | 4-dimethylaminomethylamino-2,2,5,5-tetrakis(trifluoromethyl)-3-imidazoline hydrochloride. | 19.2±1.2 | 7.5±1.2 |
| 30 | 4-acetylimino-2,2,5,5-tetrakis(trifluoromethyl)-imidazolidine. | 24.0±1.9 | 13.4±1.1 |
| 31 | Tetramethylammonium Salt of 4-acetylimino-2,2,5,5-tetrakis (trifluoromethyl)imidazolidine. | 16.0±1.6 | 8.8±1.03 |
| 32 | 4-chloroacetylimino-2,2,5,5-tetrakis(trifluoromethyl)-imidazolidine. | 16.5±1.4 | 9.8±0.77 |
| 33 | 4-acetylimino-3-methyl-2,2,5,5-tetrakis(trifluoromethyl)imidazolidine. | 24.0±2.5 | 15.0±0.85 |
| 39 | 4-(heptanoylimino)-2,2,5,5-tetrakis (trifluoromethyl)-imidazolidine. | 28.5±2.9 | 10.0±0.6 |
| 43 | 4-(carbethoxyimino)-2,2,5,5-tetrakis(trifluoromethyl)-imidazolidine. | 14.5±1.4 | 10.2±0.87 |
| 44 | 4-(carbomethoxyimino)-2,2,5,5-tetrakis(trifluoromethyl)imidazolidine. | 17.0±1.0 | 11.5±1.1 |
| 45 | 4-(2-dimethylaminoethoxy-carbonylimino)-2,2,5,5-tetrakis(trifluoromethyl)-imidazolidine. | 33.5±3.2 | 19.2±1.9 |

In pharmaceutical application, the compounds of this invention will be administered to the body orally, parenterally and by other methods. The dosage will vary and will depend on such factors as the condition being treated; age and weight of the recipient; the responsiveness of the recipient; prior, concurrent and intended subsequent medication and treatment; general health of the recipient, frequency of treatment; and of course of the nature of the effect desired.

Generally speaking, the active compound will be administered in a physiologically beneficial amount. Administration can be in a single dose or in a plurality of doses over an extended period of time. It will of course also be understood that an initial dose, or first group of doses, in a course of treatment, can be in greater amounts if appropriate, and a rapid response is sought by the early administration of relatively large doses and thereafter the minimally effective dosage, or maintenance dosage, is determined.

A single dose will rarely exceed about 10 or 20 milligrams of active compound per kilogram within this invention, although larger amounts can be used as called for in any given situation. Extremely small doses will effect some benefit but as a practical matter a single dose of less than about 0.001 to 0.002 milligram per kilogram will seldom be used. Ordinarily, doses will range from 0.05 to 10 mg./kg. and preferably 0.05 to 5 mg./kg. Doses can be repeated in the same or greater or lesser amounts over a period of time as long as improvement in the recipient is observed or as long as needed under the circumstances.

The compound will ordinarily be administered with a non-toxic pharmaceutical carrier in a variety of practical dosage forms. These dosage forms are novel compositions comprising the non-toxic pharmaceutical carrier and a physiologically beneficial amount of the active compound. These highly useful dosage forms constitute an important aspect of the present invention.

Suitable non-toxic pharmaceutical carriers or vehicles include liquids such as water, aromatic water, alcohols, syrups, elixirs, pharmaceutical mucilages, such as acacia and tragacanth, oils of petroleum, animal, vegetable or synthetic origin, for example, peanut oil, soybean oil, fish oil such as cod liver oil, or the like, for oral administration; water, saline, aqueous lactose, aqueous maltose, aqueous glucose (dextrose), aqueous sucrose, or the like, for administration by injection. Suitable solid carriers include soft gelatin capsules, hard gelatin capsules, slow or delayed release pills or capsules, powders, tableting vehicles, and the like. Suitable solid or liquid non-toxic pharmaceutical carriers are well known in the art and the selection of carrier can be from those appropriate and available in accordance with well-known prescription techniques. The compositions of this invention therefore includes such dosage form as solutions, suspensions, syrups, elixirs, tablets, capsules, powder packets, and the like.

A vast number of suitable pharmaceutical carriers are described in "Remington's Practice of Pharmacy," edited by E. W. Martin and E. F. Cook, 12th edition, 1961, published by the Mack Publishing Company, Easton, Pa.

In these novel compositions the new active compounds of this invention will be present in a physiologically beneficial amount as mentioned above. In practice, this means that the active ingredient will ordinarily constitute at least about 0.001% by weight based on the total weight of the composition. For oral administration in liquid medium, the concentration will ordinarily be in the range from about 0.01–2.0% by weight of active ingredient. For injection, concentrations from 0.005–0.5% are satisfactory. In tablets, powders, capsules and the like, the amount of active ingredient may if desired be as much as 10 to 50% or more by weight of the total composition.

The active compounds of this invention can be formulated if desired with one or more pharmaceutically active materials for combination effects, treatments and benefits. Such materials include but are by no means limited to antidepressants or stimulants, vitamins, pain killers, tranquilizers, antibiotics, antitussive agents, etc. The compositions can of course contain suitable pharmaceutical modifiers such as coloring agents, sweetening or other flavoring agents, solubilizing agents, etc., as will readily occur to persons skilled in this art.

The following further examples illustrate specific pharmaceutical compositions for administration to a living body:

EXAMPLE E

4 - imino - 2,2,5,5 - tetrakis(trifluoromethyl)imidazolidine is formulated conveniently in ethyl alcohol USP-water in 0.05% by weight concentration for oral administration, with and without a flavoring agent, and a coloring agent, etc.; and in 0.5, 1, 5, 10, and 25 milligram amounts in standard two-piece hard gelatin capsules with a diluent such as starch, mannitol or lactose, for oral administration. In pharmacologic applications it is administered in these dosage forms at dosage levels in the range of 0.5 to 100 milligrams for treatment of physiologic conditions as described above.

Similar formulations are made with 4-imino-3-methyl-2,2,5,5 - tetrakis(trifluoromethyl)imidazolidine and 3- ethyl - 4 - imino - 2,2,5,5 - tetrakis(trifluoromethyl)imidazolidine.

EXAMPLE F

4 - imino - 2,2,5,5 - tetrakis(trifluoromethyl)imidazolidine can be formulated with suitable tableting adjuvants using a conventional tableting machine with the active ingredient constituting 1–50% by weight of the tablet. Other ingredients include gelatin, magnesium stearate, and starch or mannitol.

Formulations of the type illustrated by Example F are also made with any of the active solid compounds of this invention.

EXAMPLE G

4 - imino - 2,2,5,5 - tetrakis(trifluoromethyl)imidazolidine can be formulated in a soft gelatin capsule by dissolving the compound in polyethylene glycol (of molecular weight of about 400) or soybean oil in concentrations of 0.05 to 10% weight/volume. The solution containing the compound is injected into the gelatin to form the capsule using a positive displacement pump set to deliver a specific volume depending on the dose required. The capsules are then dried before use.

Capsules prepared thus can be administered from 1 to 6 times daily to patients for relief of various types of muscle disorder.

Soft gelatin capsule formulations of the type of Example G are also made with compounds such as 3-methyl-4 - methylimino - 2,2,5,5 - tetrakis(trifluoromethyl)imidazolidine, 3 - ethyl - 4 - imino - 2,2,5,5 - tetrakis(trifluoromethyl)imidazolidine, 4 - imino - 3 - methyl - 2,2,5,5 - tetrakis(trifluoromethyl)imidazolidine, 4 - imino - 2,5 - bis(difluoromethyl) - 2,5 - bis(trifluoromethyl)imidazolidine, and 4 - hydroxymethylamino - 2,2,5,5 - tetrakis(trifluoromethyl) - 3 - imidazoline.

EXAMPLE H

No. 5 two-piece hard gelatin capsules can be filled with 110 g. of a mixture consisting of 1.0 mg. of 4-imino-2,2,5,5 - tetrakis(trifluoromethyl)imidazolidine, 0.2 mg. of the finely divided, fumed silicon dioxide known commercially as Cab-O-Sil® and approximately 109 mg. of lactose.

Any of the active compounds of this invention can be used in formulations of the type illustrated by Example H.

EXAMPLE I

A flavored syrup containing 1 mg. of 4-imino-2,2,5,5-terakis(trifluoromethyl)imidazolidine in 5 ml. can be prepared by dissolving the compound in a flavored solution of sorbitol containing up to 50% of ethyl alcohol USP so that the final concentration is 0.02% weight/volume.

The disclosure herein should not be taken as a recommendation to use the disclosed invention in any way without full compliance with U.S. Food and Drug Laws and other laws and governmental regulations which may be applicable.

Since obvious modifications and equivalents in the invention will be evident to those skilled in the chemical arts, I proposed to be bound solely by the appended claims.

The embodiments of the invention in which an exclusive property or privilege is claimed are defined as follows:

1. A compound, wherein any halogen is fluorine, chlorine, or bromine, of the group consisting of:

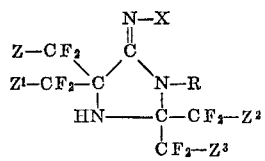

and

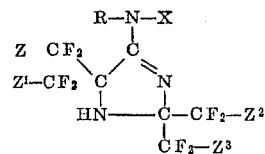

wherein:
(A) R is hydrogen or alkyl;
(B) X is selected from the group consisting of:
—C(CF$_3$)$_2$NH$_2$; hydrogen; alkyl; benzyl, carbethoxymethyl; lower alkenyl; dimethylaminoethyl; lower alkynyl; cyclohexyl; cyclohexenyl; lower alkyl substituted with 1 halogen or 1 lower alkoxy; or carboxymethyl;
hydroxymethyl; hydroxymethoxymethyl; N-pyrrolidylmethyl; N-piperidylmethyl; N-morpholinylmethyl; or dimethylaminomethyl;

where Q is alkyl; lower alkyl substituted with up to 3 halogen or 1 lower alkoxy; phenyl; phenyl substituted with up to 3 halogen, 2 lower alkyl, 1 lower alkoxy, 1 amino or 1 lower alkyl-substituted amino; 2,4-dichlorophenoxymethyl; lower alkenyl; naphthyl; or amino(lower alkyl) or alkyl-substituted amino(lower alkyl) where the substituents are alkyl of 1–4 carbons;

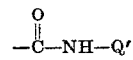

where Q' is lower alkyl; cyclohexyl; hydroxy(lower alkyl); phenyl; phenyl substituted with up to 2 halogen, 1 lower alkyl or 1 lower alkoxy; naphthyl; or dimethylaminophenyl;

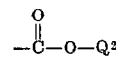

where Q$^2$ is lower alkyl; cyclohexyl; or (CH$_2$)$_2$N(CH$_3$)$_2$;

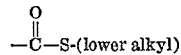

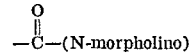

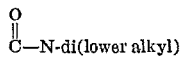

or cholesteryl; and
(C) Z, Z$^1$, Z$^2$ and Z$^3$, alike or different, are selected from the group consisting of hydrogen, fluorine, and chlorine;
(D) with the proviso that R and X together are of no more than 30 carbons.

2. 4 - [ - amino - 2,2,2-trifluoro-1-(trifluoromethyl) ethylamino] - 2,2,5,5-tetrakis(trifluoromethyl)-3-imidazoline.

3. 4 - [1 - amino-2,2-difluoro-1-(trifluoromethyl)ethylamino] - 2,5-bis(difluoromethyl)-2,5-bis(trifluoromethyl)-3-imidazoline.

4. 4 - imino-2,2,5,5-tetrakis(trifluoromethyl)imidazolidine, its tautomeric form, and mixtures thereof.

5. 4 - imino - 2,5-bis(difluoromethyl)-2,5-bis(trifluoromethyl)imidazolidine, its tautomeric form, and mixtures thereof.

6. 4 - hydroxymethylamino - 2,2,5,5-tetrakis(trifluoromethyl)-3-imidazoline.

7. 4 - dimethylaminomethylamino-2,2,5,5-tetrakis(trifluoromethyl)-3-imidazoline.

8. 3 - ethyl - 4-imino-2,2,5,5-tetrakis(trifluoromethyl) imidazolidine.

9. 4 - (hydroxymethoxymethylamino)-2,2,5,5-tetrakis (trifluoromethyl)-3-imidazoline.

10. 4 - (N-methylpyrrolidiniummethylamino)-2,2,5,5-tetrakis(trifluoromethyl)-3-imidazoline iodide.

11. 4 - acetylimino - 2,2,5,5-tetrakis(trifluoromethyl) imidazolidine.

12. A compound of claim 1 in which any halogen is fluorine.

13. In a process for preparing a compound of claim 1 in which R and X are hydrogen, the step comprising reacting, at a temperature in the range —40° to 100° C.: an alkali metal cyanide; and at least one polyhaloalkylidenimine of the formula

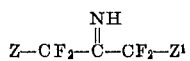

Z and Z¹ being as in claim 1.

14. The process of claim 13 including the step of heating any intermediaate carrying a polyhalomethylethylamino substituent to eliminate said substituent.

15. The process of claim 13 in which the polyhaloalkylidenimine is hexafluoroisopropylidenimine.

16. The process of claim 13 in which the polyhaloalkylidenimine is pentafluoroisopropylidenimine.

No reference cited.

HENRY R. JILES, Primary Examiner

N. TROUSOF, Assistant Examiner

U.S. Cl. X.R.

260—30, 239, 247, 293, 309; 424—241, 248, 267, 273

UNITED STATES PATENT OFFICE
CERTIFICATE OF CORRECTION

Patent No. 3,459,766                                                   August 5, 1969

William J. Middleton

It is certified that error appears in the above identified patent and that said Letters Patent are hereby corrected as shown below:

Column 2, line 19, "arakyl" should read -- aralkyl --. Col 7, lines 6 to 13, the second formula in equation should appear as shown below:

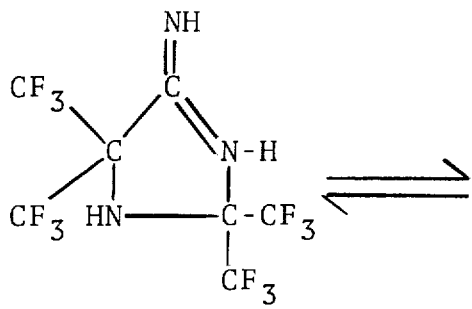

same column 7, lines 14 to 19, the formula should appear as show below:

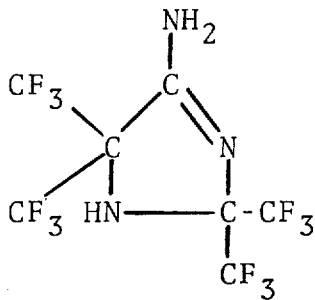

Column 15, lines 14 and 15, "15 carbon atoms the following alkyl derivatives of 4-imidazolidine; and" should read -- 3-butyl-4-imino-2,2,5,5-tetrakis(chlorodifluoromethyl)imidazolidine; and -- line 56, "($CH_2C_8H_5^+$)." should read -- ($CH_2C_6H_5^+$). --. Column 17, line 18, "4-cyclohexylamino-2,2,5-tetrakis" should read -- 4-cyclohexylamino-2,2,5,5-tetrakis --. Column 18, line 52, "106-109° C." should read -- 106-108° C. --. Column 21, lines 18 to 22, cancel "Pyrrolidine, 10ml., was added to a hot (90° C.) solution of 10 g. of 4-imino-2,2,5,5-tetrakis(trifluoromethyl)-imidazolidine in 50 ml. of 37% formaldehyde (aqueous solution). The resulting reaction mixture was cooled and the solid that precipitated was collected on a filter,".

Column 25, lines 14 to 20, the formula should appear as shown below:

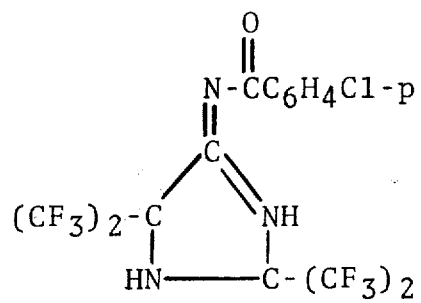

Column 29, line 43, "N, 11.97" should read -- N, 11.07 --.
Column 33, line 1, "samle" should read -- sample --. Column 40, lines 1 to 7, the formula should appear as shown below:

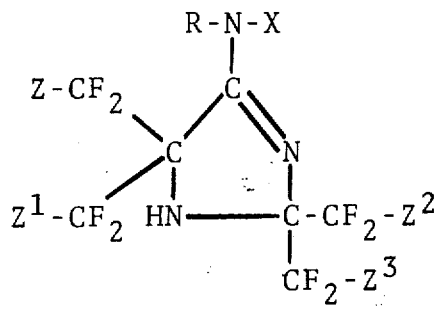

same column 40, line 54, "4-[ -amino" should read -- 4-[1-amino --.

Signed and sealed this 27th day of October 1970.

(SEAL)
Attest:

EDWARD M. FLETCHER, JR.
Attesting Officer

WILLIAM E. SCHUYLER, JR.
Commissioner of Patents